US012803739B2

(12) United States Patent
Bao et al.

(10) Patent No.: US 12,803,739 B2
(45) Date of Patent: Nov. 17, 2026

(54) DYNAMIC BANDWIDTH CONFIGURATION FOR POSITIONING REFERENCE SIGNAL (PRS) OPERATION

(71) Applicant: QUALCOMM Incorporated, San Diego, CA (US)

(72) Inventors: Jingchao Bao, San Diego, CA (US); Weimin Duan, San Diego, CA (US); Sony Akkarakaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 17/410,487

(22) Filed: Aug. 24, 2021

(65) Prior Publication Data

US 2022/0069962 A1 Mar. 3, 2022

Related U.S. Application Data

(60) Provisional application No. 63/071,290, filed on Aug. 27, 2020.

(51) Int. Cl.
*H04L 5/00* (2006.01)
*G01S 5/02* (2010.01)
(Continued)

(52) U.S. Cl.
CPC .......... *H04L 5/0051* (2013.01); *G01S 5/0249* (2020.05); *H04W 64/003* (2013.01); *H04W 72/044* (2013.01)

(58) Field of Classification Search
None
See application file for complete search history.

(56) References Cited

U.S. PATENT DOCUMENTS 9,253,677 B2 * 2/2016 Siomina ................ H04L 5/0005
10,547,421 B2 1/2020 Palanivelu et al.
(Continued)

FOREIGN PATENT DOCUMENTS

CN 110730501 A 1/2020
WO WO-2018064537 4/2018
(Continued)

OTHER PUBLICATIONS

International Search Report and Written Opinion—PCT/US2021/047466—ISA/EPO—Dec. 6, 2021.
(Continued)

*Primary Examiner* — Suk Jin Kang
(74) *Attorney, Agent, or Firm* — Muncy, Geissler, Olds & Lowe, P.C.

(57) ABSTRACT

Disclosed are techniques for wireless communication. In an aspect, a user equipment (UE) performs one or more time-based measurements of one or more first positioning reference signal (PRS) occasions transmitted by a first transmission-reception point (TRP), the one or more first PRS occasions having a first bandwidth, receives an indication to switch from measuring PRS occasions from the first TRP in the first bandwidth to measuring PRS occasions from the first TRP in a second bandwidth, and performs one or more angle-only measurements of one or more second PRS occasions transmitted by the first TRP, the one or more second PRS occasions having the second bandwidth.

23 Claims, 13 Drawing Sheets

(51) Int. Cl.
*H04W 64/00* (2009.01)
*H04W 72/044* (2023.01)

(56) References Cited

U.S. PATENT DOCUMENTS

| | | | | |
|---|---|---|---|---|
| 10,585,164 | B2 * | 3/2020 | Priyanto | G01S 5/0236 |
| 10,660,109 | B2 | 5/2020 | Bitra et al. | |
| 10,979,273 | B2 | 4/2021 | John Wilson et al. | |
| 2012/0264449 | A1 * | 10/2012 | Kazmi | G01S 5/011 455/456.1 |
| 2013/0040673 | A1 * | 2/2013 | Siomina | G01S 5/0226 455/501 |
| 2013/0303199 | A1 * | 11/2013 | Siomina | H04W 24/10 455/456.5 |
| 2015/0208262 | A1 * | 7/2015 | Siomina | H04W 24/10 370/252 |
| 2017/0289953 | A1 | 10/2017 | Chae | |
| 2018/0124787 | A1 * | 5/2018 | Wang | G01S 5/0236 |
| 2019/0090092 | A1 * | 3/2019 | Hwang | G01S 5/0215 |
| 2019/0162817 | A1 * | 5/2019 | Priyanto | G01S 5/0236 |
| 2019/0178976 | A1 * | 6/2019 | Xiong | H04W 64/00 |
| 2020/0021946 | A1 | 1/2020 | Kumar et al. | |
| 2020/0127785 | A1 * | 4/2020 | Blankenship | G01S 1/68 |
| 2020/0154240 | A1 * | 5/2020 | Edge | H04W 16/28 |
| 2020/0166602 | A1 * | 5/2020 | Priyanto | G01S 13/40 |
| 2020/0228381 | A1 | 7/2020 | Manolakos et al. | |
| 2020/0267685 | A1 * | 8/2020 | Qi | H04B 7/0617 |
| 2020/0267686 | A1 * | 8/2020 | Hunukumbure | H04W 72/0446 |
| 2020/0274676 | A1 * | 8/2020 | Liu | H04W 52/0206 |
| 2021/0058891 | A1 * | 2/2021 | Huang | H04W 24/10 |
| 2021/0072340 | A1 * | 3/2021 | Wang | H04L 5/0048 |
| 2021/0282106 | A1 * | 9/2021 | Xiong | H04W 64/00 |
| 2021/0297216 | A1 * | 9/2021 | Shreevastav | G01S 1/20 |
| 2021/0329618 | A1 * | 10/2021 | Chervyakov | G01S 5/0221 |
| 2021/0352613 | A1 * | 11/2021 | Yoon | H04L 5/0032 |
| 2022/0022158 | A1 * | 1/2022 | Zarifi | H04L 5/0048 |
| 2022/0038239 | A1 * | 2/2022 | Guo | H04L 5/0051 |
| 2022/0050163 | A1 * | 2/2022 | Si | H04W 24/10 |
| 2022/0095265 | A1 * | 3/2022 | Cha | H04L 5/0048 |
| 2022/0116089 | A1 * | 4/2022 | Khoryaev | H04B 7/0695 |
| 2022/0132463 | A1 * | 4/2022 | Cha | H04B 17/27 |
| 2022/0140880 | A1 * | 5/2022 | Cha | H04B 7/0695 375/262 |
| 2022/0159415 | A1 * | 5/2022 | Khoryaev | H04L 27/261 |
| 2022/0173857 | A1 * | 6/2022 | Michalopoulos | H04B 17/27 |
| 2022/0209927 | A1 * | 6/2022 | Shreevastav | H04L 5/0069 |
| 2022/0231809 | A1 * | 7/2022 | Cha | H04W 72/044 |
| 2022/0286254 | A1 * | 9/2022 | Cha | H04W 24/10 |
| 2023/0020648 | A1 * | 1/2023 | Cha | H04W 24/10 |
| 2023/0037478 | A1 * | 2/2023 | Huang | H04L 5/0094 |
| 2023/0038050 | A1 * | 2/2023 | Si | H04W 24/10 |
| 2023/0068270 | A1 * | 3/2023 | Cha | H04L 5/0094 |
| 2023/0078554 | A1 * | 3/2023 | Cha | H04L 5/0051 |
| 2023/0079502 | A1 * | 3/2023 | Cha | H04W 64/00 |
| 2023/0112171 | A1 * | 4/2023 | Guo | H04L 5/0094 370/336 |
| 2023/0116323 | A1 * | 4/2023 | Cha | H04L 5/0091 370/329 |
| 2023/0127908 | A1 * | 4/2023 | Berggren | G01S 5/0268 455/456.1 |
| 2023/0180173 | A1 * | 6/2023 | Kazmi | H04L 5/001 455/456.1 |
| 2023/0283424 | A1 * | 9/2023 | Rao | H04L 5/0048 370/329 |
| 2023/0397157 | A1 * | 12/2023 | Huang | H04W 24/10 |
| 2024/0201310 | A1 * | 6/2024 | Hasegawa | G01S 5/0036 |

FOREIGN PATENT DOCUMENTS

| | | | | |
|---|---|---|---|---|
| WO | WO-2018093835 | | 5/2018 | |
| WO | WO-2019182806 A1 | | 9/2019 | |
| WO | WO-2020092715 A1 | * | 5/2020 | H04L 5/0048 |

OTHER PUBLICATIONS

LG Electronics: “Consideration on the PRS Channel Bandwidth for RSTD Requirements Based on the UE RF Capability”, 3GPP Draft, 3GPP TSG RAN WG4 Meeting #62BIS, R4-122002, Consideration on the RSTD Requirements Based on the UE RF Capability REV1, 3rd Generation Partnership Project (3GPP), Mobile Competence Centre, 650, Route Des Lucioles, F-06921 Sophia-Antipolis Cedex, France, vol. RAN WG4, No. Jeju, South Korea, Mar. 26, 2012-Mar. 30, 2012, MAR. 20, 2012 (Mar. 20, 2012), XP050613361, 7 Pages, [Retrieved Mar. 20, 2012] Whole Document.

Mediatek: “Discussion on PRS RSTD measurement”, 3GPP Draft, 3GPP TSG RAN WG4 meeting #93, R4-1913264, 3rd Gen Partnership Project (3GPP), Mobile Competence Centre, 650, Route Des Lucioles, F-06921 Sophia-Antipolis Cedex, FR, vol. RAN WG4, No. Reno, Nevada, USA, Nov. 18, 2019-Nov. 22, 2019,Nov. 8, 2019 (Nov. 8, 2019), XP051817886,7 Pages,Retrieved from Internet: URL: https://ftp.3gpp.org/tsg_ran/WG4_Radio/TSGR4_93/Docs/R4-1913264.zip.R4-1913264.Discussion on PRS-RSTD Measurement.docx[Retrieved Nov. 8, 2019]whole document.

Qualcomm Incorporated: “On DL PRS RSTD Measurements in NR Positioning”, 3GPP TSG-RAN WG4 Meeting #92-Bis, R4-1912347, Chongqing, China, Oct. 14, 2019-Oct. 18, 2019, Oct. 5, 2019, pp. 1-6.

* cited by examiner

DYNAMIC BANDWIDTH CONFIGURATION FOR POSITIONING REFERENCE SIGNAL (PRS) OPERATION

CROSS-REFERENCE TO RELATED APPLICATIONS

The present Application for Patent claims the benefit of U.S. Provisional Application No. 63/071,290, entitled "MEASUREMENT PERIOD FORMULATION FOR REFERENCE SIGNAL TIME DIFFERENCE (RSTD) MEASUREMENTS," filed Aug. 27, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes performing one or more time-based measurements of one or more first positioning reference signal (PRS) occasions transmitted by a first transmission-reception point (TRP), the one or more first PRS occasions having a first bandwidth; receiving an indication to switch from measuring PRS occasions from the first TRP in the first bandwidth to measuring PRS occasions from the first TRP in a second bandwidth; and performing one or more angle-only measurements of one or more second PRS occasions transmitted by the first TRP, the one or more second PRS occasions having the second bandwidth.

In an aspect, a method of wireless communication performed by a network entity includes transmitting, to a user equipment (UE), an indication to switch from measuring positioning reference signal (PRS) occasions transmitted by a first transmission-reception point (TRP) in a first bandwidth to measuring PRS occasions transmitted by the first TRP in a second bandwidth; receiving, from the UE, a first measurement report comprising one or more time-based measurements of one or more first PRS occasions having the first bandwidth; and receiving, from the UE, a second measurement report comprising one or more angle-only measurements of one or more second PRS occasions.

In an aspect, a user equipment (UE) includes a memory; at least one transceiver; and at least one processor communicatively coupled to the memory and the at least one transceiver, the at least one processor configured to: perform one or more time-based measurements of one or more first positioning reference signal (PRS) occasions transmitted by a first transmission-reception point (TRP), the one or more first PRS occasions having a first bandwidth; receive, via the at least one transceiver, an indication to switch from measuring PRS occasions from the first TRP in the first bandwidth to measuring PRS occasions from the first TRP in a second bandwidth; and perform one or more angle-only measurements of one or more second PRS occasions transmitted by the first TRP, the one or more second PRS occasions having the second bandwidth.

In an aspect, a network entity includes a memory; at least one transceiver; and at least one processor communicatively coupled to the memory and the at least one transceiver, the at least one processor configured to: transmit, via the at least one transceiver, to a user equipment (UE), an indication to switch from measuring positioning reference signal (PRS) occasions transmitted by a first transmission-reception point (TRP) in a first bandwidth to measuring PRS occasions transmitted by the first TRP in a second bandwidth; receive, via the at least one transceiver, from the UE, a first measurement report comprising one or more time-based measurements of one or more first PRS occasions having the first bandwidth; and receive, via the at least one transceiver, from the UE, a second measurement report comprising one or more angle-only measurements of one or more second PRS occasions.

In an aspect, a user equipment (UE) includes means for performing one or more time-based measurements of one or more first positioning reference signal (PRS) occasions transmitted by a first transmission-reception point (TRP), the one or more first PRS occasions having a first bandwidth; means for receiving an indication to switch from measuring PRS occasions from the first TRP in the first bandwidth to measuring PRS occasions from the first TRP in a second bandwidth; and means for performing one or more angle-only measurements of one or more second PRS occasions transmitted by the first TRP, the one or more second PRS occasions having the second bandwidth.

In an aspect, a network entity includes means for transmitting, to a user equipment (UE), an indication to switch from measuring positioning reference signal (PRS) occasions transmitted by a first transmission-reception point (TRP) in a first bandwidth to measuring PRS occasions transmitted by the first TRP in a second bandwidth; means for receiving, from the UE, a first measurement report comprising one or more time-based measurements of one or more first PRS occasions having the first bandwidth; and means for receiving, from the UE, a second measurement report comprising one or more angle-only measurements of one or more second PRS occasions.

In an aspect, a non-transitory computer-readable medium stores computer-executable instructions that, when executed by a user equipment (UE), cause the UE to: perform one or more time-based measurements of one or more first positioning reference signal (PRS) occasions transmitted by a first transmission-reception point (TRP), the one or more first PRS occasions having a first bandwidth; receive an indication to switch from measuring PRS occasions from the first TRP in the first bandwidth to measuring PRS occasions from the first TRP in a second bandwidth; and perform one or more angle-only measurements of one or more second PRS occasions transmitted by the first TRP, the one or more second PRS occasions having the second bandwidth.

In an aspect, a non-transitory computer-readable medium stores computer-executable instructions that, when executed by a network entity, cause the network entity to: transmit, to a user equipment (UE), an indication to switch from measuring positioning reference signal (PRS) occasions transmitted by a first transmission-reception point (TRP) in a first bandwidth to measuring PRS occasions transmitted by the first TRP in a second bandwidth; receive, from the UE, a first measurement report comprising one or more time-based measurements of one or more first PRS occasions having the first bandwidth; and receive, from the UE, a second measurement report comprising one or more angle-only measurements of one or more second PRS occasions.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
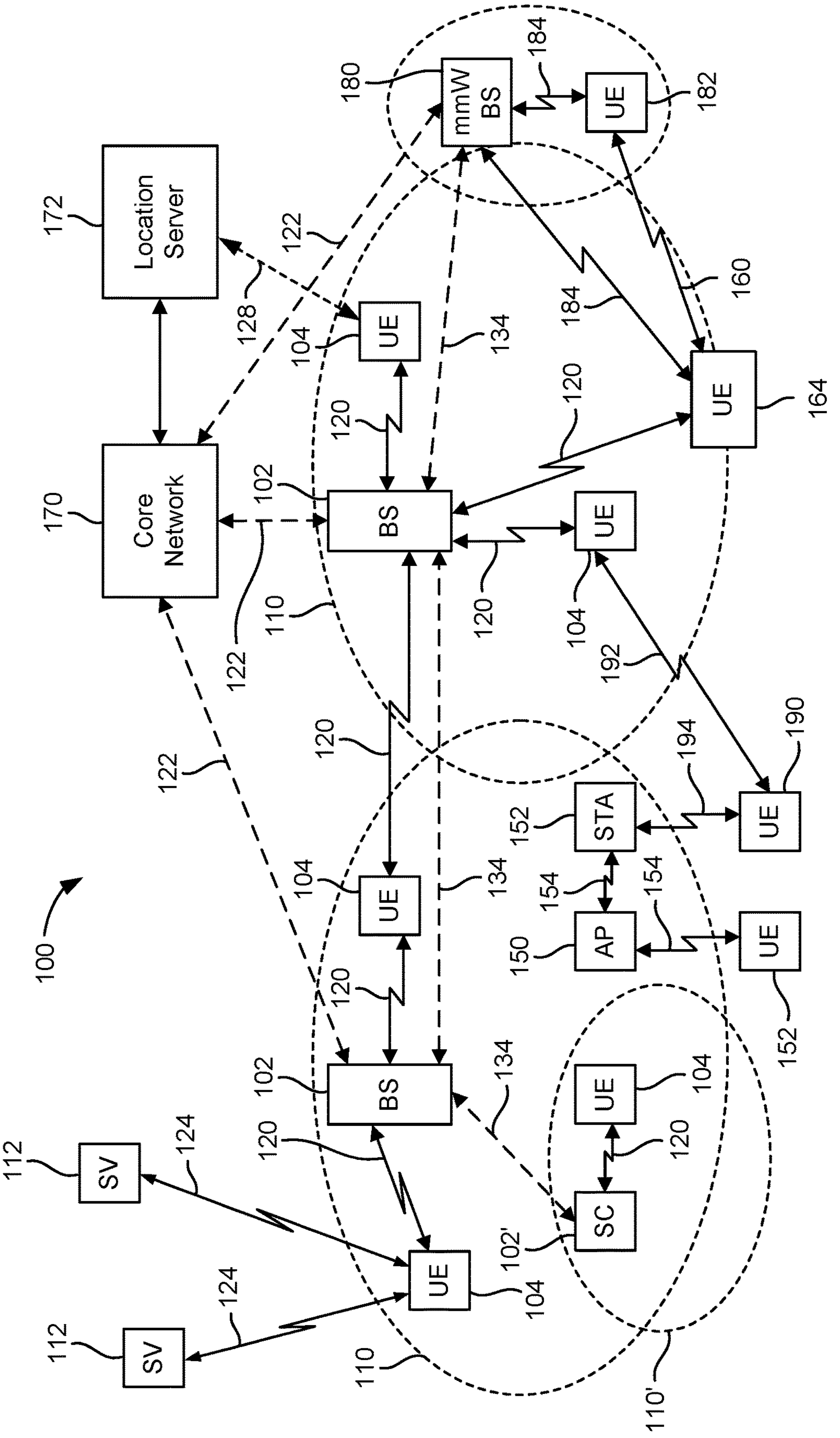
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies.

Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4*a* or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-*a* or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-MI) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
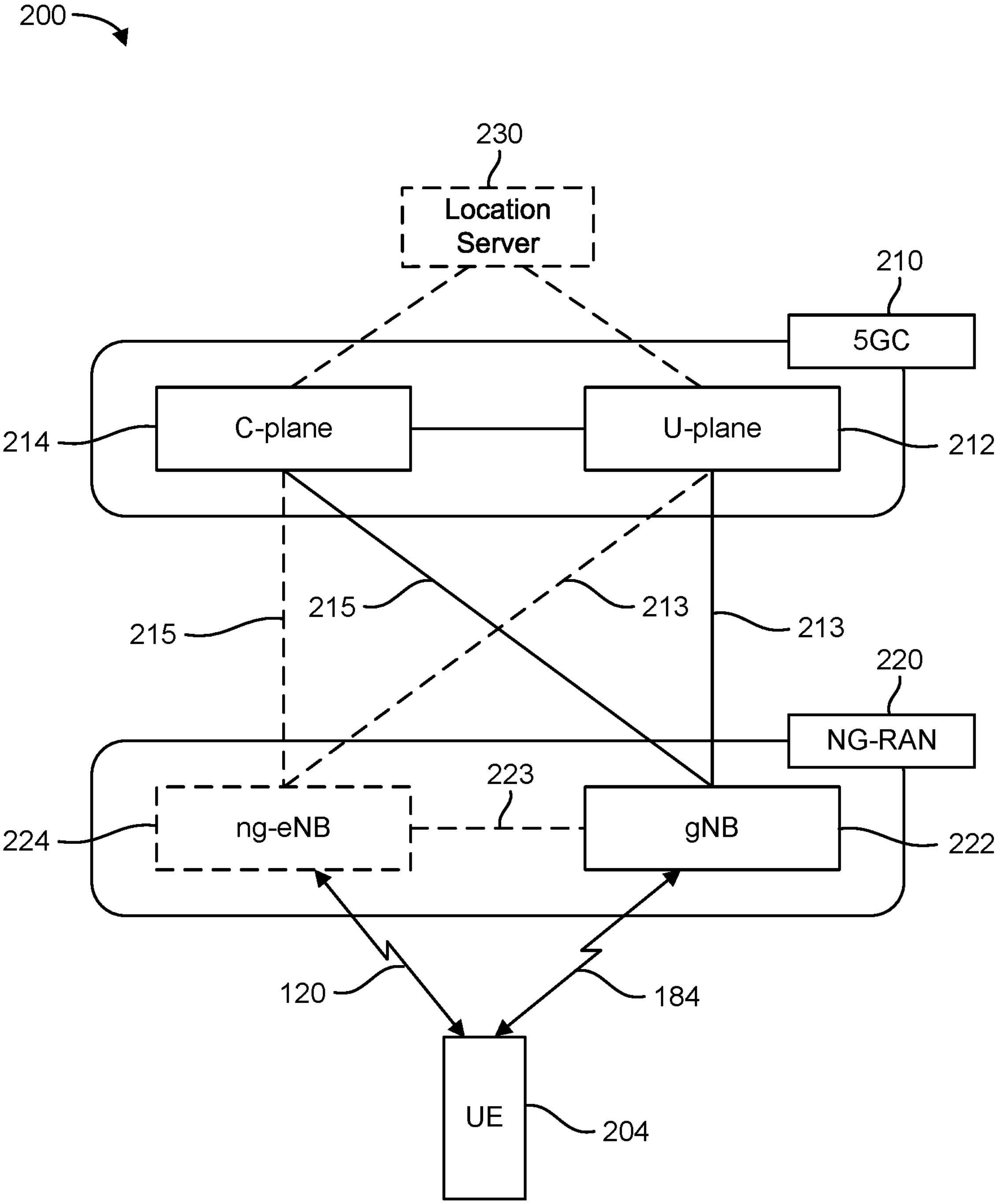
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
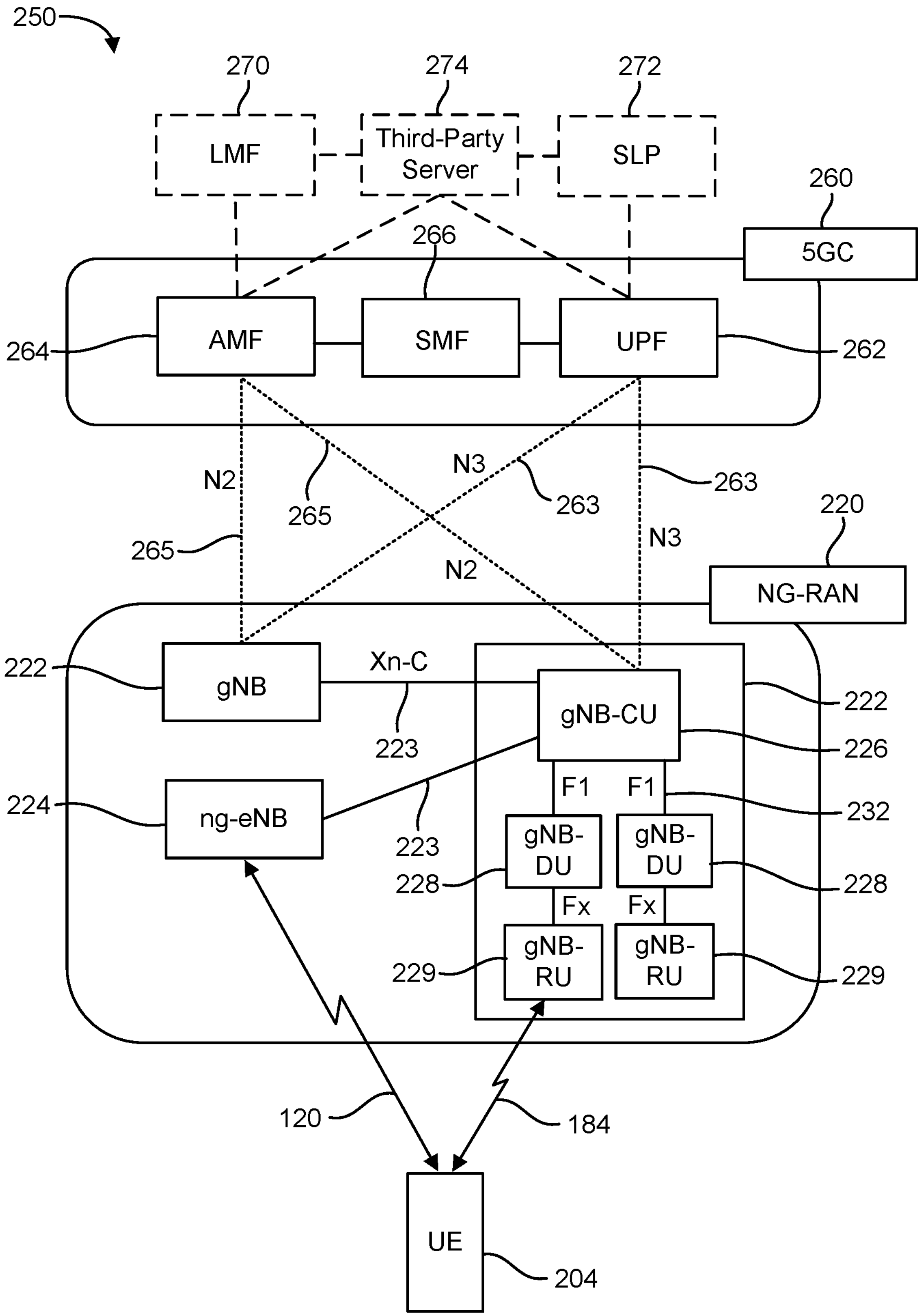

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (L1VIF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
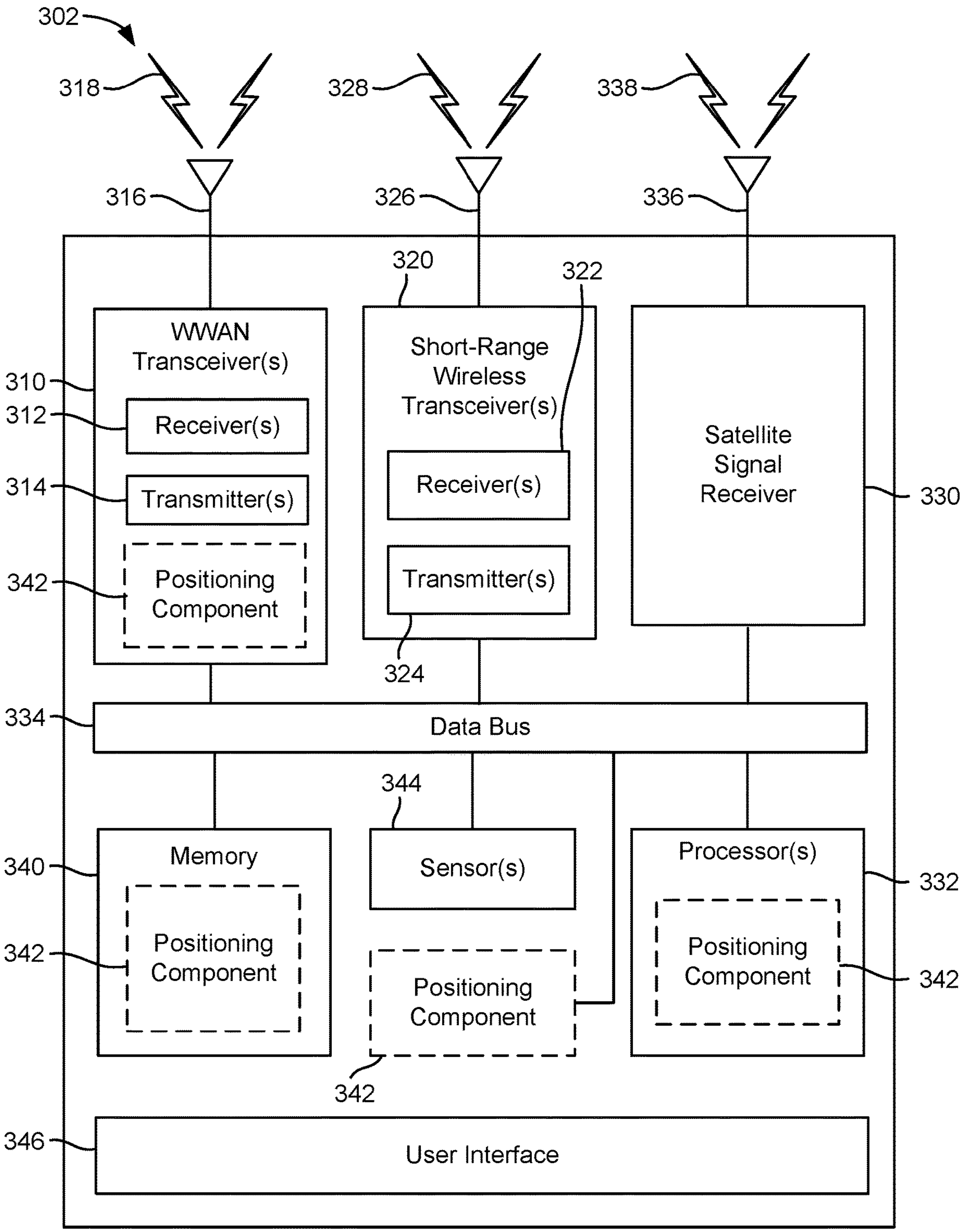
FIGS. 3A, 3B, and 3C are simplified block diagrams of several sample aspects of components that may be employed in a user equipment (UE), a base station, and a network entity, respectively, and configured to support communications as taught herein.
Figure 3B:
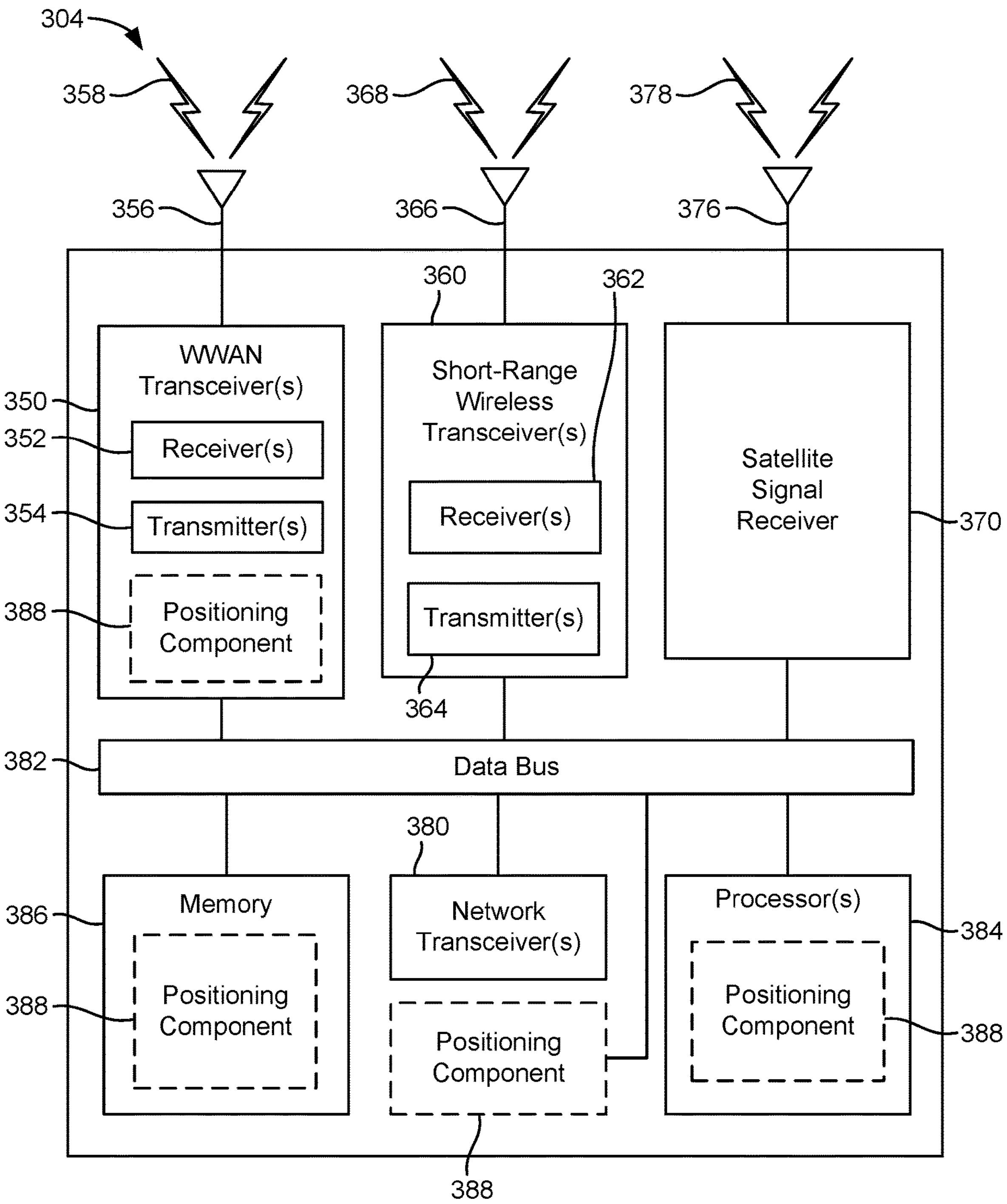
Figure 3C:
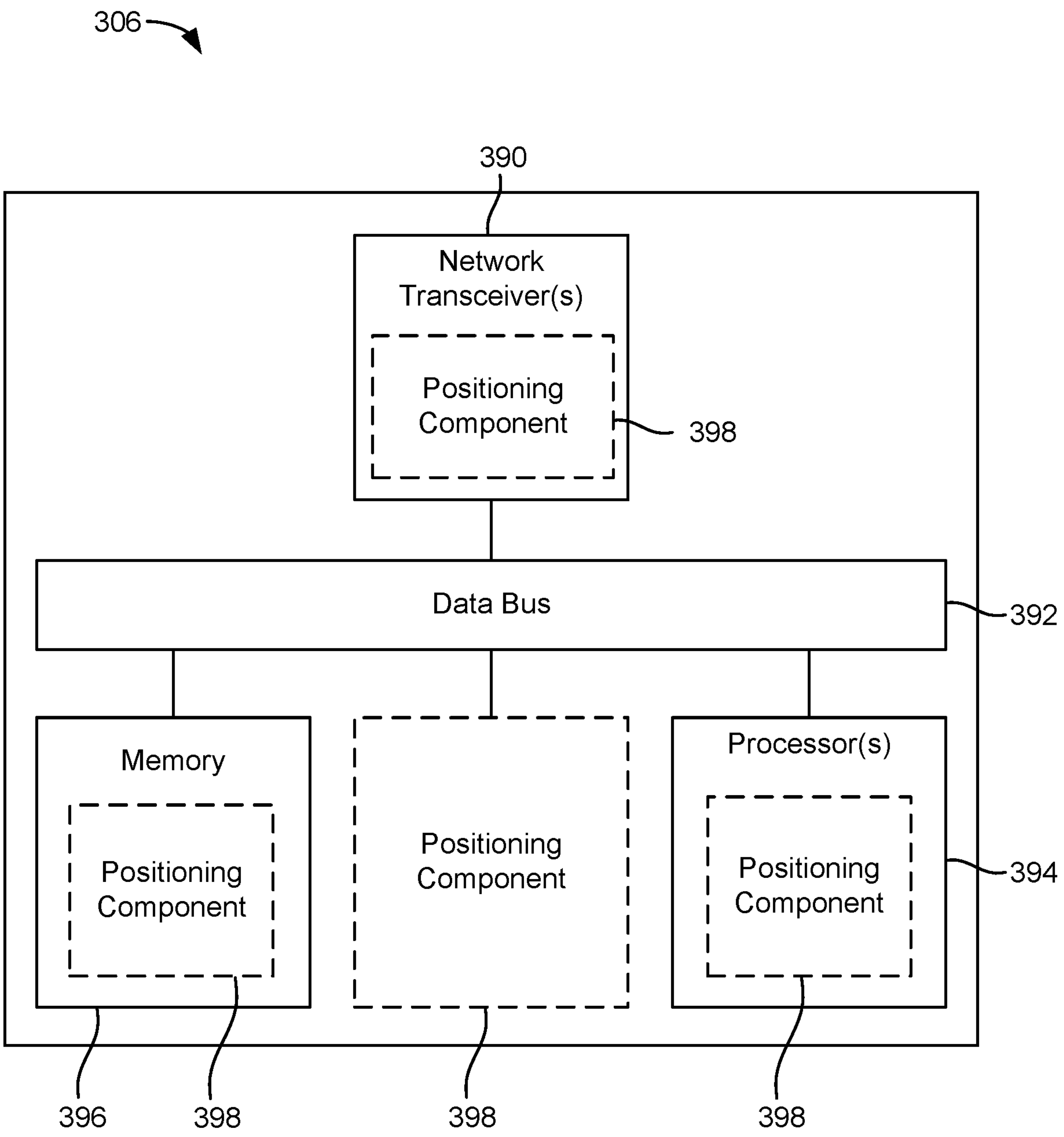

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4A:
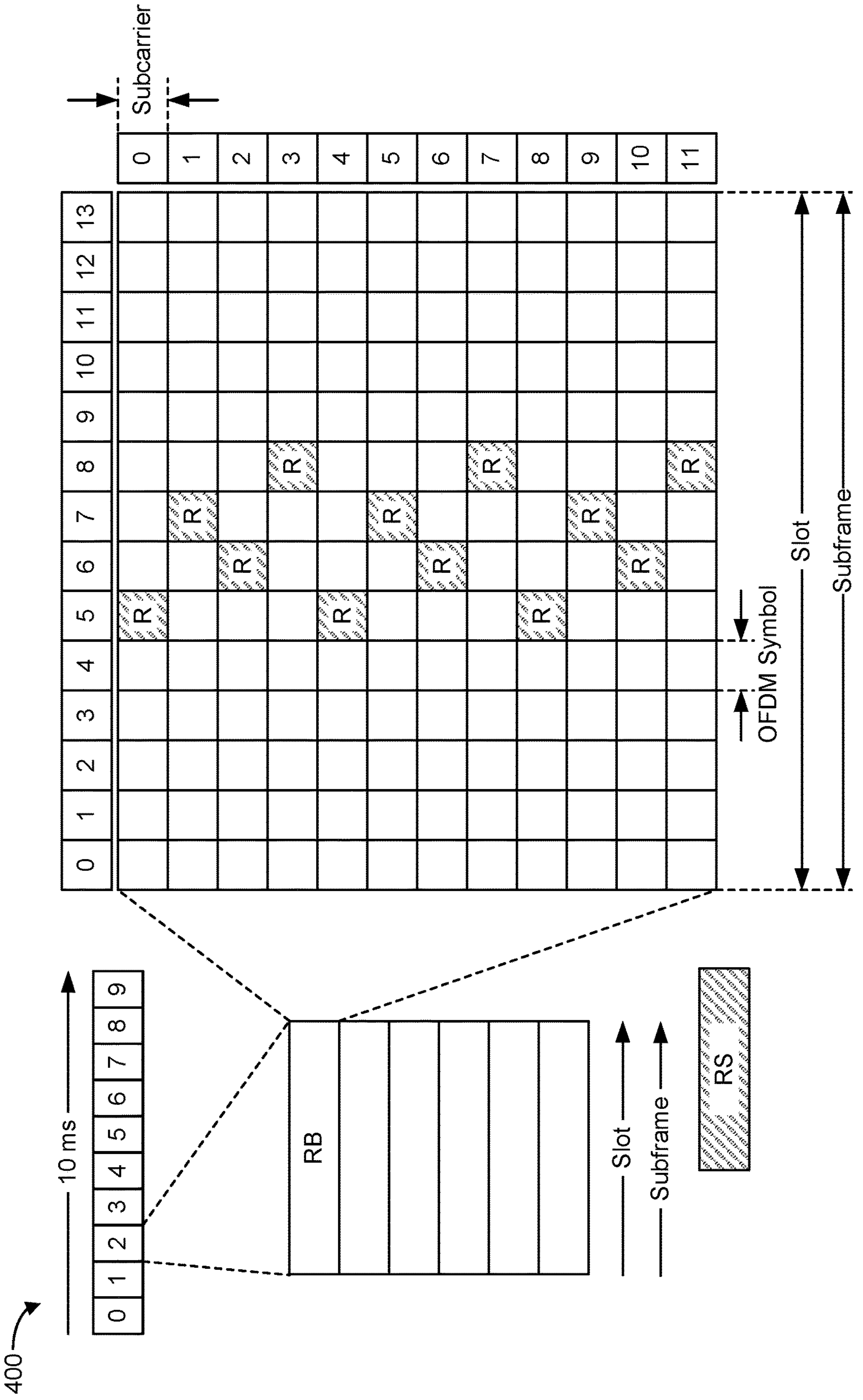
FIG. 4A is a diagram illustrating an example frame structure, according to aspects of the disclosure.

Various frame structures may be used to support downlink and uplink transmissions between network nodes (e.g., base stations and UEs). FIG. 4A is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 4A, a numerology of 15 kHz is used. Thus, in the time domain, a 10 ms frame is divided into 10 equally sized subframes of 1 ms each, and each subframe includes one time slot. In FIG. 4A, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4A, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4A illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4A); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from 2^μ*{4, 5, 8, 10, 16, 20, 32, 40, 64, 80, 160, 320, 640, 1280, 2560, 5120, 10240} slots, with μ=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance," a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 4B:
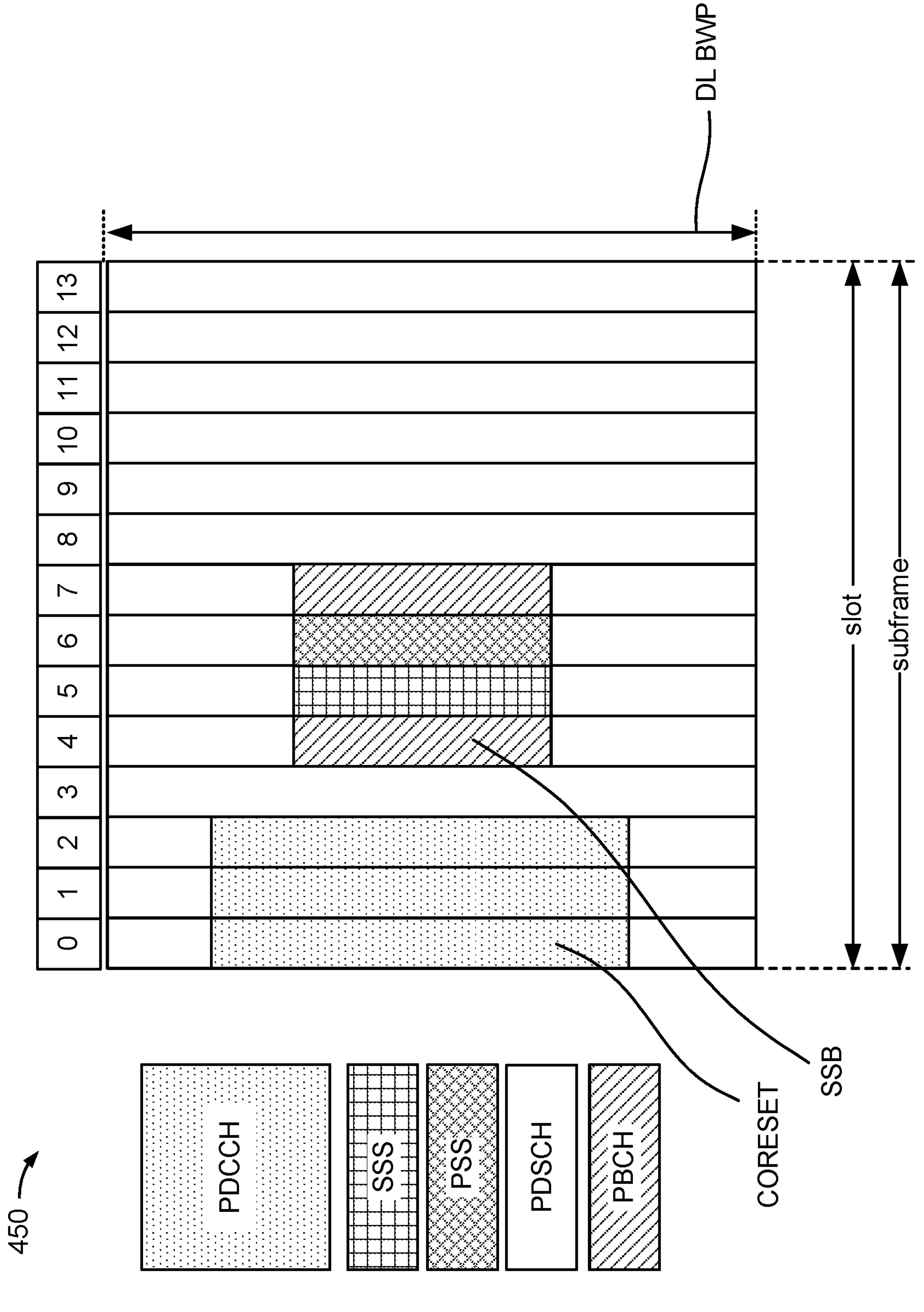
FIG. 4B is a diagram illustrating various downlink channels within an example downlink slot, according to aspects of the disclosure.

FIG. 4B is a diagram 450 illustrating various downlink channels within an example downlink slot. In FIG. 4B, time is represented horizontally (on the X axis) with time increasing from left to right, while frequency is represented vertically (on the Y axis) with frequency increasing (or decreasing) from bottom to top. In the example of FIG. 4B, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 5:
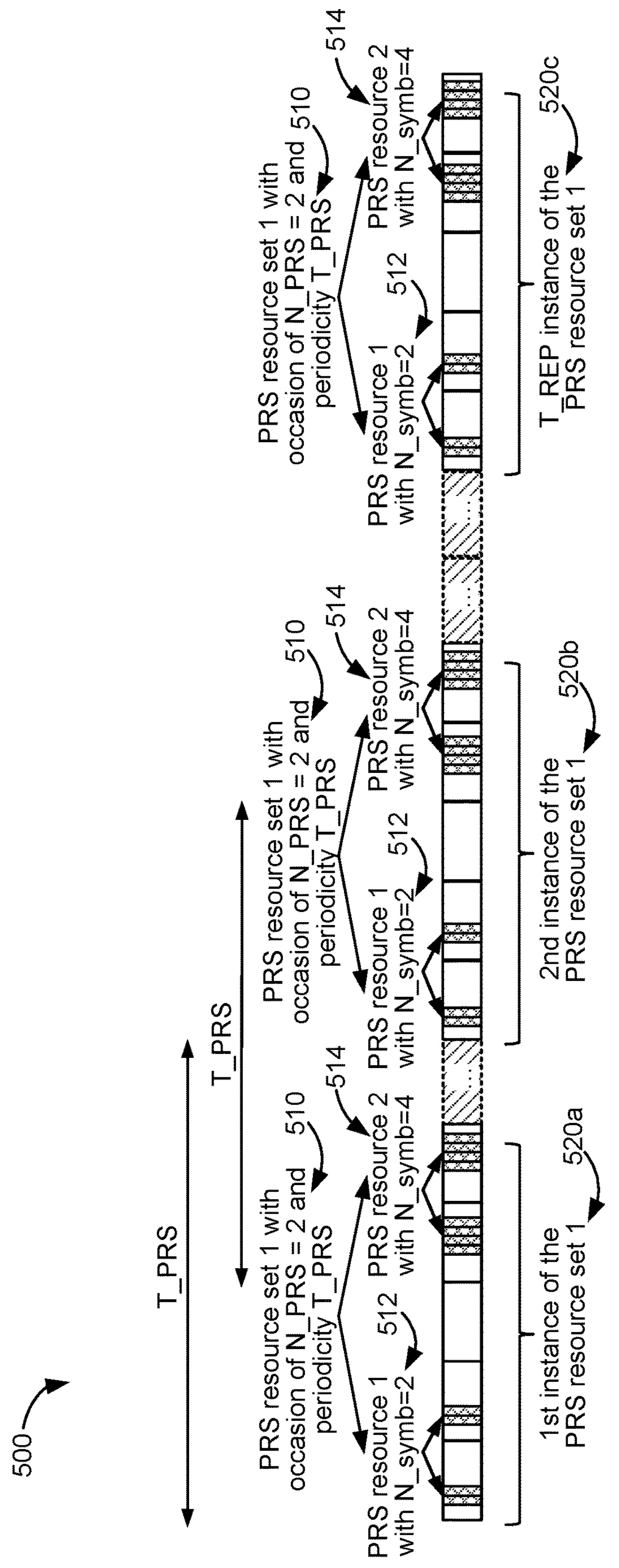
FIG. 5 is a diagram of an example positioning reference signal (PRS) configuration for the PRS transmissions of a given base station, according to aspects of the disclosure.

FIG. 5 is a diagram of an example PRS configuration 500 for the PRS transmissions of a given base station, according to aspects of the disclosure. In FIG. 5, time is represented horizontally, increasing from left to right. Each long rectangle represents a slot and each short (shaded) rectangle represents an OFDM symbol. In the example of FIG. 5, a PRS resource set 510 (labeled "PRS resource set 1") includes two PRS resources, a first PRS resource 512 (labeled "PRS resource 1") and a second PRS resource 514 (labeled "PRS resource 2"). The base station transmits PRS on the PRS resources 512 and 514 of the PRS resource set 510.

The PRS resource set 510 has an occasion length (N_PRS) of two slots and a periodicity (T_PRS) of, for example, 160 slots or 160 milliseconds (ms) (for 15 kHz subcarrier spacing). As such, both the PRS resources 512 and 514 are two consecutive slots in length and repeat every T_PRS slots, starting from the slot in which the first symbol of the respective PRS resource occurs. In the example of FIG. 5, the PRS resource 512 has a symbol length (N_symb) of two symbols, and the PRS resource 514 has a symbol length (N_symb) of four symbols. The PRS resource 512 and the PRS resource 514 may be transmitted on separate beams of the same base station.

Each instance of the PRS resource set 510, illustrated as instances 520*a,* 520*b,* and 520*c,* includes an occasion of length '2' (i.e., N_PRS=2) for each PRS resource 512, 514 of the PRS resource set. The PRS resources 512 and 514 are repeated every T_PRS slots up to the muting sequence periodicity T_REP. As such, a bitmap of length T_REP would be needed to indicate which occasions of instances 520*a,* 520*b,* and 520*c* of PRS resource set 510 are muted (i.e., not transmitted).

In an aspect, there may be additional constraints on the PRS configuration 500. For example, for all PRS resources (e.g., PRS resources 512, 514) of a PRS resource set (e.g., PRS resource set 510), the base station can configure the following parameters to be the same: (a) the occasion length (N_PRS), (b) the number of symbols (N_symb), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE' s capability to support the first and/or second option.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE' s location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
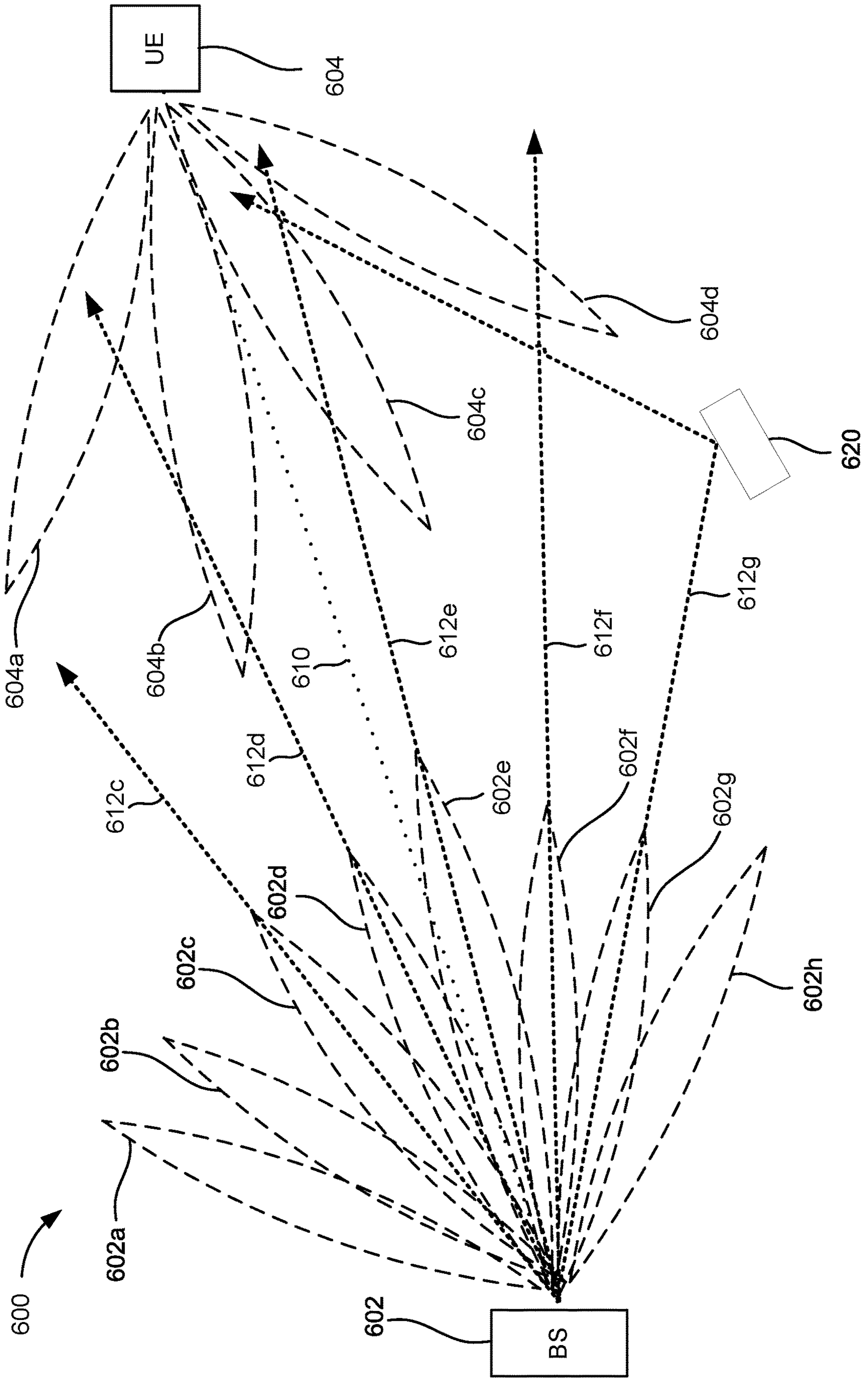
FIG. 6 is a diagram illustrating an example base station in communication with an example UE, according to aspects of the disclosure.

FIG. 6 is a diagram 600 illustrating a base station (BS) 602 (which may correspond to any of the base stations described herein) in communication with a UE 604 (which may correspond to any of the UEs described herein). Referring to FIG. 6, the base station 602 may transmit a beamformed signal to the UE 604 on one or more transmit beams 602*a*, 602*b*, 602*c*, 602*d*, 602*e*, 602*f*, 602*g*, 602*h*, each having a beam identifier that can be used by the UE 604 to identify the respective beam. Where the base station 602 is beamforming towards the UE 604 with a single array of antennas (e.g., a single TRP/cell), the base station 602 may perform a "beam sweep" by transmitting first beam 602*a*, then beam 602*b*, and so on until lastly transmitting beam 602*h*. Alternatively, the base station 602 may transmit beams 602*a*-602*h* in some pattern, such as beam 602*a*, then beam 602*h*, then beam 602*b*, then beam 602*g*, and so on. Where the base station 602 is beamforming towards the UE 604 using multiple arrays of antennas (e.g., multiple TRPs/cells), each antenna array may perform a beam sweep of a subset of the beams 602*a*-602*h*. Alternatively, each of beams 602*a*-602*h* may correspond to a single antenna or antenna array.

FIG. 6 further illustrates the paths 612*c*, 612*d*, 612*e*, 612*f*, and 612*g* followed by the beamformed signal transmitted on beams 602*c*, 602*d*, 602*e*, 602*f*, and 602*g*, respectively. Each path 612*c*, 612*d*, 612*e*, 612*f*, 612*g* may correspond to a single "multipath" or, due to the propagation characteristics of radio frequency (RF) signals through the environment, may be comprised of a plurality (a cluster) of "multipaths." Note that although only the paths for beams 602*c*-602*g* are shown, this is for simplicity, and the signal transmitted on each of beams 602*a*-602*h* will follow some path. In the example shown, the paths 612*c*, 612*d*, 612*e*, and 612*f* are straight lines, while path 612*g* reflects off an obstacle 620 (e.g., a building, vehicle, terrain feature, etc.).

The UE 604 may receive the beamformed signal from the base station 602 on one or more receive beams 604*a*, 604*b*, 604*c*, 604*d*. Note that for simplicity, the beams illustrated in FIG. 6 represent either transmit beams or receive beams, depending on which of the base station 602 and the UE 604 is transmitting and which is receiving. Thus, the UE 604 may also transmit a beamformed signal to the base station 602 on one or more of the beams 604*a*-604*d*, and the base station 602 may receive the beamformed signal from the UE 604 on one or more of the beams 602*a*-602*h*.

In an aspect, the base station 602 and the UE 604 may perform beam training to align the transmit and receive beams of the base station 602 and the UE 604. For example, depending on environmental conditions and other factors, the base station 602 and the UE 604 may determine that the best transmit and receive beams are 602*d* and 604*b*, respectively, or beams 602*e* and 602*c*, respectively. The direction of the best transmit beam for the base station 602 may or may not be the same as the direction of the best receive beam, and likewise, the direction of the best receive beam for the UE 604 may or may not be the same as the direction of the best transmit beam. Note, however, that aligning the transmit and receive beams is not necessary to perform a downlink angle-of-departure (DL-AoD) or uplink angle-of-arrival (UL-AoA) positioning procedure.

To perform a DL-AoD positioning procedure, the base station 602 may transmit reference signals (e.g., PRS, CRS, TRS, CSI-RS, PSS, SSS, etc.) to the UE 604 on one or more of beams 602*a*-602*h*, with each beam having a different transmit angle. The different transmit angles of the beams will result in different received signal strengths (e.g., RSRP, RSRQ, SINR, etc.) at the UE 604. Specifically, the received signal strength will be lower for transmit beams 602*a*-602*h* that are further from the line of sight (LOS) path 610 between the base station 602 and the UE 604 than for transmit beams 602*a*-602*h* that are closer to the LOS path 610.

In the example of FIG. 6, if the base station 602 transmits reference signals to the UE 604 on beams 602*c*, 602*d*, 602*e*, 602*f*, and 602*g*, then transmit beam 602*e* is best aligned with the LOS path 610, while transmit beams 602*c*, 602*d*, 602*f*, and 602*g* are not. As such, beam 602*e* is likely to have a higher received signal strength at the UE 604 than beams 602*c*, 602*d*, 602*f*, and 602*g*. Note that the reference signals transmitted on some beams (e.g., beams 602*c* and/or 602*f*) may not reach the UE 604, or energy reaching the UE 604 from these beams may be so low that the energy may not be detectable or at least can be ignored.

The UE 604 can report the received signal strength, and optionally, the associated measurement quality, of each measured transmit beam 602*c*-602*g* to the base station 602, or alternatively, the identity of the transmit beam having the highest received signal strength (beam 602*e* in the example of FIG. 6). Alternatively or additionally, if the UE 604 is also engaged in a round-trip-time (RTT) or time-difference of arrival (TDOA) positioning session with at least one base station 602 or a plurality of base stations 602, respectively, the UE 604 can report reception-to-transmission (Rx-Tx) time difference or reference signal time difference (RSTD) measurements (and optionally the associated measurement qualities), respectively, to the serving base station 602 or other positioning entity. In any case, the positioning entity (e.g., the base station 602, a location server, a third-party client, UE 604, etc.) can estimate the angle from the base station 602 to the UE 604 as the AoD of the transmit beam having the highest received signal strength at the UE 604, here, transmit beam 602*e*.

In one aspect of DL-AoD-based positioning, where there is only one involved base station 602, the base station 602 and the UE 604 can perform a round-trip-time (RTT) procedure to determine the distance between the base station 602 and the UE 604. Thus, the positioning entity can determine both the direction to the UE 604 (using DL-AoD positioning) and the distance to the UE 604 (using RTT positioning) to estimate the location of the UE 604. Note that the AoD of the transmit beam having the highest received signal strength does not necessarily lie along the LOS path 610, as shown in FIG. 6. However, for DL-AoD-based positioning purposes, it is assumed to do so.

In another aspect of DL-AoD-based positioning, where there are multiple involved base stations 602, each involved base station 602 can report, to the serving base station 602, the determined AoD from the respective base station 602 to the UE 604, or the RSRP measurements. The serving base station 602 may then report the AoDs or RSRP measurements from the other involved base station(s) 602 to the positioning entity (e.g., UE 604 for UE-based positioning or a location server for UE-assisted positioning). With this information, and knowledge of the base stations' 602 geographic locations, the positioning entity can estimate a location of the UE 604 as the intersection of the determined AoDs. There should be at least two involved base stations 602 for a two-dimensional (2D) location solution, but as will be appreciated, the more base stations 602 that are involved in the positioning procedure, the more accurate the estimated location of the UE 604 will be.

To perform an UL-AoA positioning procedure, the UE 604 transmits uplink reference signals (e.g., UL-PRS, SRS, DMRS, etc.) to the base station 602 on one or more of uplink transmit beams 604*a*-604*d*. The base station 602 receives the uplink reference signals on one or more of uplink receive beams 602*a*-602*h*. The base station 602 determines the angle of the best receive beams 602*a*-602*h* used to receive the one or more reference signals from the UE 604 as the AoA from the UE 604 to itself. Specifically, each of the receive beams 602*a*-602*h* will result in a different received signal strength (e.g., RSRP, RSRQ, SINR, etc.) of the one or more reference signals at the base station 602. Further, the channel impulse response of the one or more reference signals will be smaller for receive beams 602*a*-602*h* that are further from the actual LOS path between the base station 602 and the UE 604 than for receive beams 602*a*-602*h* that are closer to the LOS path. Likewise, the received signal strength will be lower for receive beams 602*a*-602*h* that are further from the LOS path than for receive beams 602*a*-602*h* that are closer to the LOS path. As such, the base station 602 identifies the receive beam 602*a*-602*h* that results in the highest received signal strength and, optionally, the strongest channel impulse response, and estimates the angle from itself to the UE 604 as the AoA of that receive beam 602*a*-602*h*. Note that as with DL-AoD-based positioning, the AoA of the receive beam 602*a*-602*h* resulting in the highest received signal strength (and strongest channel impulse response if measured) does not necessarily lie along the LOS path 610. However, for UL-AoA-based positioning purposes in FR2, it may be assumed to do so.

Note that while the UE 604 is illustrated as being capable of beamforming, this is not necessary for DL-AoD and UL-AoA positioning procedures. Rather, the UE 604 may receive and transmit on an omni-directional antenna.

Where the UE 604 is estimating its location (i.e., the UE is the positioning entity), it needs to obtain the geographic location of the base station 602. The UE 604 may obtain the location from, for example, the base station 602 itself or a location server (e.g., location server 230, LMF 270, SLP 272). With the knowledge of the distance to the base station 602 (based on the RTT or timing advance), the angle between the base station 602 and the UE 604 (based on the UL-AoA of the best receive beam 602*a*-602*h*), and the known geographic location of the base station 602, the UE 604 can estimate its location.

Alternatively, where a positioning entity, such as the base station 602 or a location server, is estimating the location of the UE 604, the base station 602 reports the AoA of the receive beam 602*a*-602*h* resulting in the highest received signal strength (and optionally strongest channel impulse response) of the reference signals received from the UE 604, or all received signal strengths and channel impulse responses for all receive beams 602*a*-602*h* (which allows the positioning entity to determine the best receive beam 602*a*-602*h*). The base station 602 may additionally report the Rx-Tx time difference to the UE 604. The positioning entity can then estimate the location of the UE 604 based on the UE's 604 distance to the base station 602, the AoA of the identified receive beam 602*a*-602*h*, and the known geographic location of the base station 602.

The bandwidth (BW) of PRS impacts the time resolution of the PRS measurement. Specifically, the timing resolution of a PRS is the inverse of the bandwidth (i.e., 1/BW) of the PRS. Thus, the greater the bandwidth of the PRS, the higher the resolution (i.e., the higher the accuracy) of the timing measurement (e.g., ToA) of the PRS. For timing-based positioning procedures (e.g., DL-TDOA, OTDOA, RTT, etc.), the achievable accuracy is directly related to the bandwidth of the PRS. For angle-based positioning procedures (e.g., AoA, AoD, etc.), however, especially with analog beamforming, the bandwidth of the PRS has some impact, but not a significant one.

For example, for an AoD measurement (currently only DL-AoD is supported), the UE measures the RSRP for a given TRP and reports the RSRP per PRS to enable the AoD from the TRP to the UE to be determined (as described above with reference to FIG. 6). Similarly, for a DL-AoA positioning procedure, the UE will use its own receive beam to determine the AoA of DL-PRS from the TRP (the reverse of the UL-AoA procedure described above with reference to FIG. 6). In such scenarios, the UE may not be able to distinguish the respective ToAs of incoming beams if they are within the time resolution of the PRS bandwidth. However, the UE can detect the differences between beams if the respective ToAs are larger than the time resolution. This is more common for LOS and NLOS paths. That is, the UE is more likely to be able to distinguish two beams if one followed the LOS path and the other followed the NLOS path.

Accordingly, the present disclosure provides techniques to use a smaller PRS bandwidth for angle-only measurements and a larger PRS bandwidth for time-only measurements or time-and-angle-based measurements. As used herein, an angle-based measurement (e.g., AoA, AoD, RSRP, etc.) of a PRS occasion with no accompanying time-based measurement of the PRS occasion is referred to as an "angle-only" measurement. Similarly, a time-based measurement (e.g., ToA, RSTD, etc.) of a PRS occasion without an accompanying angle-based measurement is referred to as a "time-only" measurement. A "time-and-angle-based" measurement is both a time-based and an angle-based measurement of the same PRS occasion.

Using different PRS bandwidths for different types of measurements has several technical advantages. For example, rather than every PRS occasion occupying the full PRS bandwidth, only a subset of configured PRS occasions may occupy the full bandwidth and the remaining PRS occasions may occupy a smaller bandwidth. This would reduce the amount of spectrum used for PRS, opening it up for other uses. Another technical advantage is that the angle-only measurements performed on lower (smaller) bandwidth PRS occasions can be used for more rapid positioning tracking without the larger bandwidth needed for time-based measurements. That is, the UE can use a subsequent angle-only measurement of a lower bandwidth PRS occasion to refine, or update, a previous time-and-angle-based measurement of a larger bandwidth PRS occasion. Yet another technical advantage is that the angle-only measurements also serve as a beam-tracking procedure to correct, or refine, the transmit/receive beam for PRS measurement, making the PRS measurement more accurate.

Figure 7:
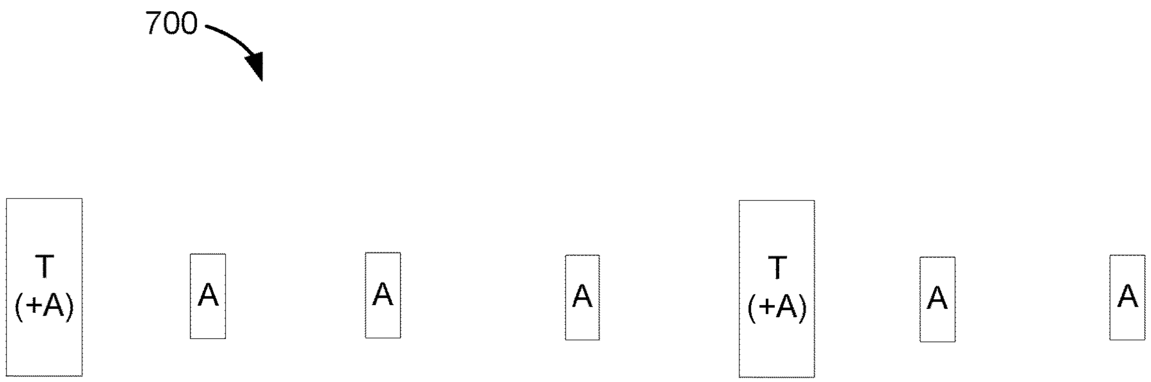
FIG. 7 is a diagram of a PRS configuration in which some PRS occasions occupy a larger bandwidth and some PRS occasions occupy a smaller bandwidth, according to aspects of the disclosure.

FIG. 7 is a diagram 700 of a PRS configuration in which some PRS occasions occupy a larger bandwidth and some PRS occasions occupy a smaller bandwidth, according to aspects of the disclosure. In the example of FIG. 7, time is represented horizontally, and each block represents a PRS occasion. Larger blocks represent PRS occasions spanning a larger bandwidth and smaller blocks represent PRS occasions spanning a smaller bandwidth. A UE may be configured to perform time-based ("T") and/or angle-based ("A") measurements of larger-bandwidth PRS occasions (labeled "T(+A)," the "(+A)" indicating that the angle measurement is optional) and angle-only ("A") measurements of smaller-bandwidth PRS occasions (labeled "A"). In the example of FIG. 7, the smaller-bandwidth PRS occasions are more frequent, but this need not be the case, and there may be an equal number of larger- and smaller-bandwidth PRS occasions, or even more larger-bandwidth PRS occasions than smaller-bandwidth PRS occasions.

A UE may report angle-based measurements as one or more RSRP measurements (one per PRS resource, or beam), one or more AoA measurements, and/or a QCL relation. Angle-only measurements may be of lower bandwidth PRS occasions performed, optionally, after time-based or time-and-angle-based measurements of higher bandwidth PRS occasions, as illustrated in FIG. 7. The network (e.g., the positioning entity) may have estimated an initial location of the UE based on the time-based or time-and-angle-based measurements. Based on the subsequent angle-only measurement(s), the positioning entity may refine the UE's estimated location with the new (updated/refined) angle-only measurement(s) plus the previous (e.g., most recent) time-based measurement(s). The positioning entity may do so by link pruning for the time-based (or time-and-angle-based) positioning method (e.g., by discarding previous time-based measurements that are not compatible with the new angle-only measurement), or correcting/updating/refining the angle for a previous angle-based measurement (e.g., by determining the mean, median, etc. with the current angle-based measurement), or the like.

Alternatively or additionally, the network (e.g., the positioning entity) may use the subsequent angle-only measurements for LOS/NLOS detection. For example, if the measured angle changes dramatically (e.g., more than some threshold) during the positioning procedure (based on the angle-only measurement(s)), it likely means that the LOS/NLOS condition of a particular link (e.g., a transmit and receive beam pairing) has changed. This can be used to prune any links and/or measurements. For example, the positioning entity can prune (discard) any links and/or measurements that no longer satisfy the LOS condition.

Alternatively or additionally, the network (e.g., the positioning entity) may use the subsequent angle-only measurements for the next time-only or time-and-angle PRS occasion. For example, the angle-only measurement can be used to update the QCL relation of the DL-PRS and the UL-PRS in the PRS configuration. Or, the angle-only measurement can be used to update the choice of downlink transmit beam. The QCL relation may be updated after one or more angle-based measurement reports. The updated QCL relation may be signaled to the UE from the location server (e.g., location server 230, LMF 270, SLP 272) through LPP or from the base station through RRC.

There are different approaches for implementing the use of a smaller PRS bandwidth for angle-only measurements and a larger PRS bandwidth for time-only measurements or time-and-angle-based measurements. As a first approach, changes can be made to the current wireless communication standard(s) defining PRS. In the current standard(s), PRS are configured with a fixed bandwidth for a particular PRS configuration, or, there may be only one bandwidth within one PRS configuration.

To change the bandwidth of different PRS occasions within the same PRS configuration, the network may use either a preconfigured approach or a dynamic approach. In the preconfigured approach, the bandwidth configuration per PRS resource can be changed to two or more bandwidths and a switching pattern can be added to the PRS configuration to indicate the PRS bandwidth per PRS occasion, slot, subframe, frame, etc. That is, a PRS configuration may specify two or more PRS bandwidths that apply at the PRS occasion level, the slot level, the frame level, etc. The PRS configuration may further include a switching pattern indicating which bandwidth is configured for which occasion, slot, frame, etc. The PRS configuration, including the switching pattern, may be signaled (preconfigured) to the UE in RRC signaling and/or LPP signaling. In an aspect, the PRS configuration may be signaled to the UE in LPP signaling and the switching pattern may be signaled to the UE in RRC signaling.

For example, referring to FIG. 7, a PRS configuration may define the two illustrated bandwidths, the larger bandwidth (referred to here as "BW1") for time-and-angle-based measurements and the smaller bandwidth (referred to here as "BW2") for angle-only measurements. In the example of FIG. 7, each block represents a PRS occasion, but each block could alternatively represent a slot, subframe, frame, etc. containing PRS. The PRS configuration may further specify a switching pattern of {BW1, BW2, BW2, BW2, BW1, BW2, BW2}. In an aspect, the PRS configuration may specify a switching pattern of the PRS occasions/slots/frames/etc. that is repeated across all PRS occasions of the positioning session. Alternatively, the PRS configuration may specify the entire switching pattern for the entire positioning session.

Alternatively or additionally, a PRS configuration may specify a measurement pattern that explicitly indicates the measurement configuration per PRS occasion, slot, frame, etc. For example, with reference to FIG. 7, the measurement pattern would be {T(+A), A, A, A, T(+A), A, A}. In an aspect, the PRS configuration may specify a measurement pattern for the PRS occasions/slots/frames/etc. that is repeated across all PRS occasions of the positioning session. Alternatively, the PRS configuration may specify the entire measurement pattern for the entire positioning session.

In the dynamic approach, a PRS configuration may contain multiple bandwidth configurations for PRS (e.g., at least one bandwidth configuration for time-and-angle-based measurements and at least one bandwidth configuration for angle-only measurements). The serving base station may then dynamically indicate the bandwidth switching using DCI, MAC control element (MAC-CE), and/or RRC signaling. The indicated switch may be a one-time switching trigger that applies to all subsequent PRS occasions, slots, frame, etc. (until the next switching trigger), or a one-time timing pattern for the next set of PRS occasions, slots, frames, etc., or a repeating timing pattern that applies to all subsequent PRS occasions, slots, frame, etc. (until the next switching trigger).

Alternatively, the location server (e.g., location server 230, LMF 270, SLP 272) may dynamically indicate a bandwidth switch to the UE using LPP signaling. As with the signaling from the base station, the switch may be a one-time switching trigger that applies to all subsequent PRS occasions, slots, frame, etc. (until the next switching trigger), or a one-time timing pattern for the next set of PRS occasions, slots, frames, etc., or a repeating timing pattern that applies to all subsequent PRS occasions, slots, frame, etc. (until the next switching trigger).

For example, with reference to FIG. 7, after the first "T(+A)" PRS occasion, the UE may receive a trigger from its serving base station (e.g., in DCI, MAC-CE, or RRC) or the location server (e.g., in LPP signaling) indicating that it should switch to the smaller bandwidth PRS configuration. The trigger may optionally indicate that the UE should switch to the smaller bandwidth PRS configuration for the next three PRS occasions, or the UE may receive a second trigger after the third "A" PRS occasion instructing it to switch to the larger bandwidth PRS occasion. The UE may receive another trigger after the second "T(+A)" PRS occasion, and so on.

The second approach for using different PRS bandwidths for different types of measurements does not impact the current wireless standard(s) defining PRS. The current standard allows greater flexibility for PRS configurations than previous versions. With this flexibility, two or more PRS configurations having different bandwidths can be defined on the same positioning frequency layer for the same TRP. At least one PRS configuration may have a larger bandwidth for time-and-angle-based measurements and at least one PRS configuration may have a smaller bandwidth for angle-only measurements. The smaller bandwidth(s) PRS configurations may have a shorter period to enable, for example, beam tracking. In addition, each PRS configuration may be associated with a muting pattern such that the PRS configurations do not overlap with each other.

Figure 8:
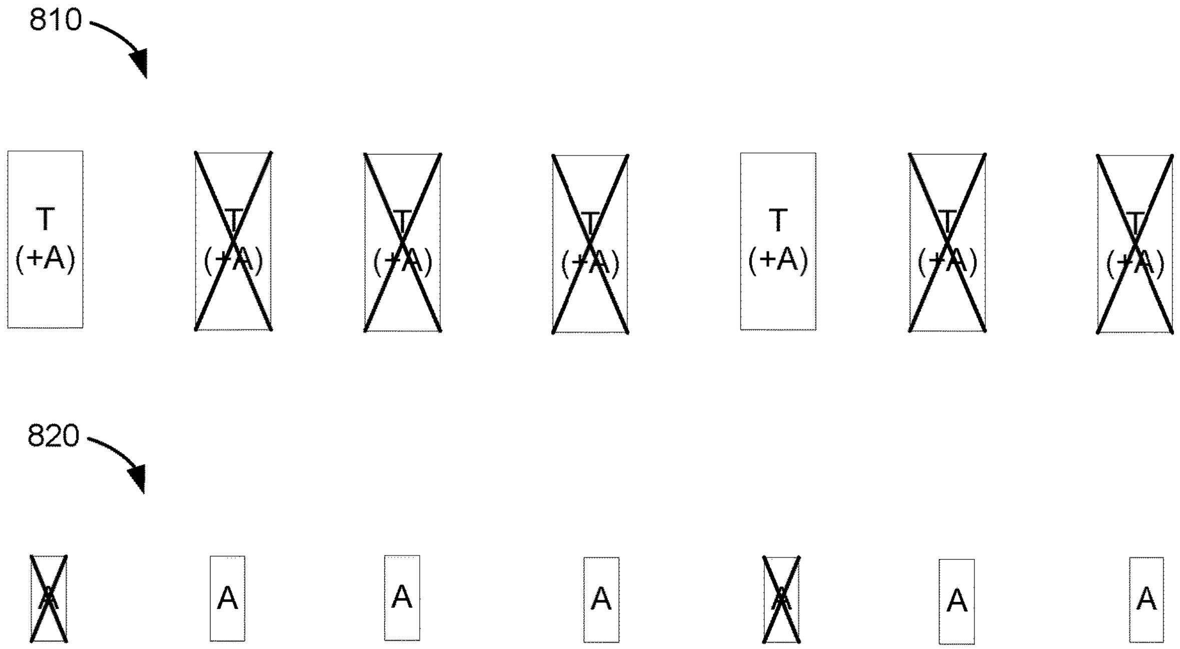
FIG. 8 illustrates an example in which two PRS configurations having different bandwidths have been defined on the same positioning frequency layer for the same TRP, according to aspects of the disclosure.

FIG. 8 illustrates an example in which two PRS configurations having different bandwidths have been defined on the same positioning frequency layer for the same TRP, according to aspects of the disclosure. In the example of FIG. 8, time is represented horizontally, and each block represents a PRS occasion. Larger blocks represent PRS occasions spanning a larger bandwidth and smaller blocks represent PRS occasions spanning a smaller bandwidth. A UE may be configured to perform time-based ("A") and angle-based ("A") measurements of larger-bandwidth PRS occasions (labeled "T(+A)," the "(+A)" indicating that the angle measurement is optional) and angle-only ("A") measurements of smaller-bandwidth PRS occasions (labeled "A").

In the example of FIG. 8, a first PRS configuration 810 defines the larger-bandwidth PRS occasions and a second PRS configuration 820 defines the smaller-bandwidth PRS occasions. The first and second PRS configurations 810 and 820 should be for the same frequency layer for the same TRP. The first and second PRS configurations 810 and 820 may also specify respective muting patterns. For the first PRS configuration 810, the second, third, fourth, sixth, and seventh PRS occasions are muted, as indicated by the crossed-out PRS occasions. For the second PRS configuration 820, the first and fifth PRS occasions are muted, as indicated by the crossed-out PRS occasions. In this way, PRS occasions in the first PRS configuration do not overlap with PRS occasions in the second PRS configuration and vice versa. As can be seen, the first and second PRS configurations 810 and 820 illustrated in FIG. 8 and their corresponding muting patterns result in the pattern of lower and higher bandwidth PRS occasions illustrated in FIG. 7.

Note that although FIG. 8 illustrates corresponding PRS occasions in each PRS configuration 810 and 820, this may not be the case. That is, it may not be the case that every PRS occasion in one PRS configuration overlaps with a PRS occasion in another PRS configuration. For example, the larger-bandwidth PRS occasions may be sparser and the smaller-bandwidth PRS occasions may be denser. In that case, the smaller-bandwidth PRS occasions that overlap with the larger-bandwidth PRS occasions may be muted, and the larger-bandwidth PRS occasions may not be muted.

In an aspect, each of the different PRS configurations may be associated with a different type of measurement report. For example, referring to FIG. 8, the first PRS configuration 810 may be for a time-and-angle-based measurement report and the second PRS configuration 820 may be for an angle-only measurement report.

Currently, a UE can only measure PRS within its current BWP if a measurement gap is not configured for PRS. A measurement gap (MG) is a configured period of time during which the serving cell refrains from transmitting to the UE so that the UE can receive transmissions (e.g., downlink reference signals) from other cells. The transmissions from the other cells may or may not be on the same frequency band as the serving cell. However, since the UE is measuring different bandwidth PRS occasions for the same base station (or more specifically, TRP), there is no need for measurement gaps.

In aspect, without needing to configure measurement gaps, the serving base station can configure the BWP during the PRS occasion, so that it can implicitly control the bandwidth of the PRS measurement. That is, the serving base station can change the UE's active BWP across PRS occasions such that PRS occasions with larger BWPs would be interleaved with PRS occasions with smaller BWPs. For example, the base station may configure a UE to measure PRS occasions for time-and-angle-based measurements on all four BWPs and to measure PRS occasions for angle-only measurements on one BWP. Referring to FIG. 7, the larger blocks may represent multiple BWPs (e.g., four) and the smaller blocks may represent a single BWP.

In an aspect, a measurement report may be a Layer 1 (L1), Layer 2 (L2), or Layer 3 (L3) report. The type of report may be based on whether the measurement report is a time-and-angle-based measurement report, a time-only report, or an angle-only report. For example, an L1 measurement report may be used for an angle-only measurement report, and an L2 or L3 measurement report may be used for a time-and-angle-based measurement report or a time-only report. However, this is merely an example, and the various types of measurement reports may be reported as any of an L1, L2, or L3 report.

Figure 9:
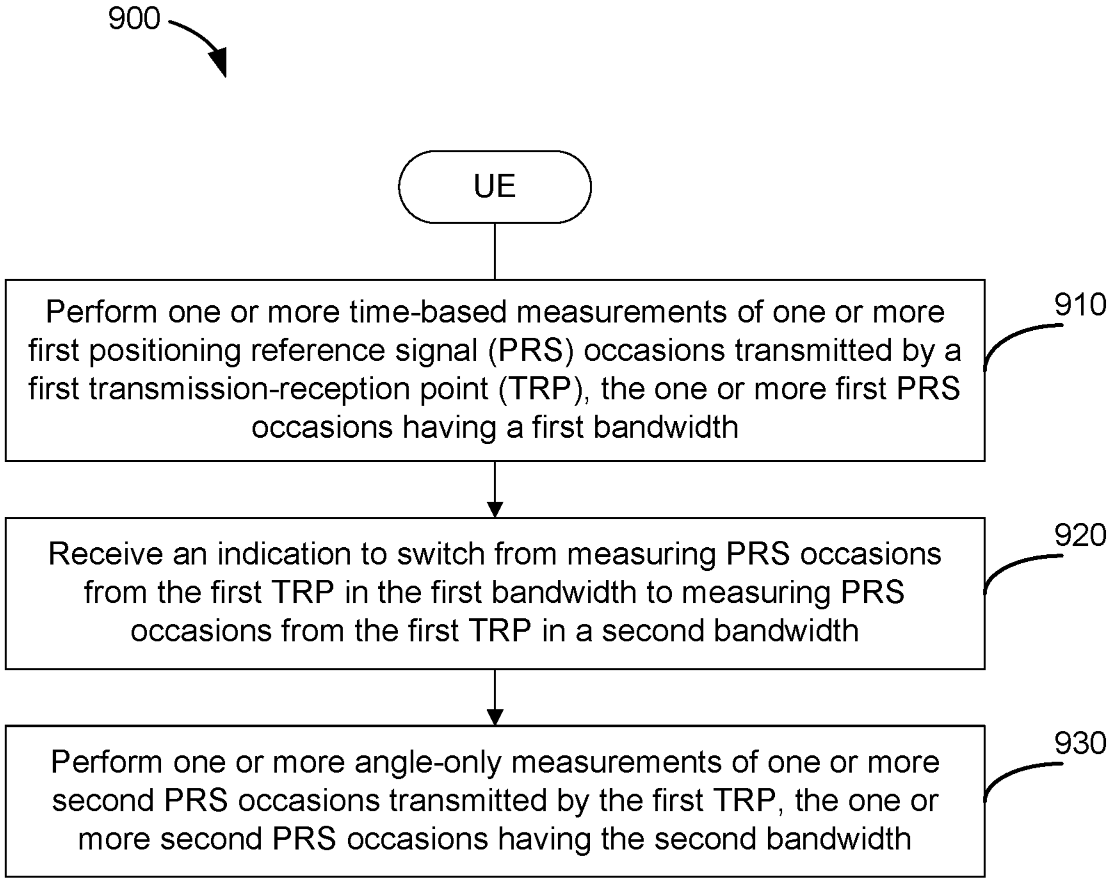
FIGS. 9 and 10 illustrate example methods of wireless communication, according to aspects of the disclosure.

FIG. 9 illustrates an example method 900 of wireless communication, according to aspects of the disclosure. In an aspect, method 900 may be performed by a UE (e.g., any of the UEs described herein).

At 910, the UE performs one or more time-based measurements of one or more first PRS occasions transmitted by a first TRP (e.g., a TRP of any of the base stations described herein), the one or more first PRS occasions having a first bandwidth, as illustrated in FIG. 7. In an aspect, operation 910 may be performed by the one or more WWAN transceivers 310, the one or more processors 332, memory 340, and/or positioning component 342, any or all of which may be considered means for performing this operation.

At 920, the UE receives an indication to switch from measuring PRS occasions from the first TRP in the first bandwidth to measuring PRS occasions from the first TRP in a second bandwidth. In an aspect, operation 920 may be performed by the one or more WWAN transceivers 310, the one or more processors 332, memory 340, and/or positioning component 342, any or all of which may be considered means for performing this operation.

At 930, the UE performs one or more angle-only measurements of one or more second PRS occasions transmitted by the first TRP, the one or more second PRS occasions having the second bandwidth, as illustrated in FIG. 7. In an aspect, operation 930 may be performed by the one or more WWAN transceivers 310, the one or more processors 332, memory 340, and/or positioning component 342, any or all of which may be considered means for performing this operation.

Figure 10:
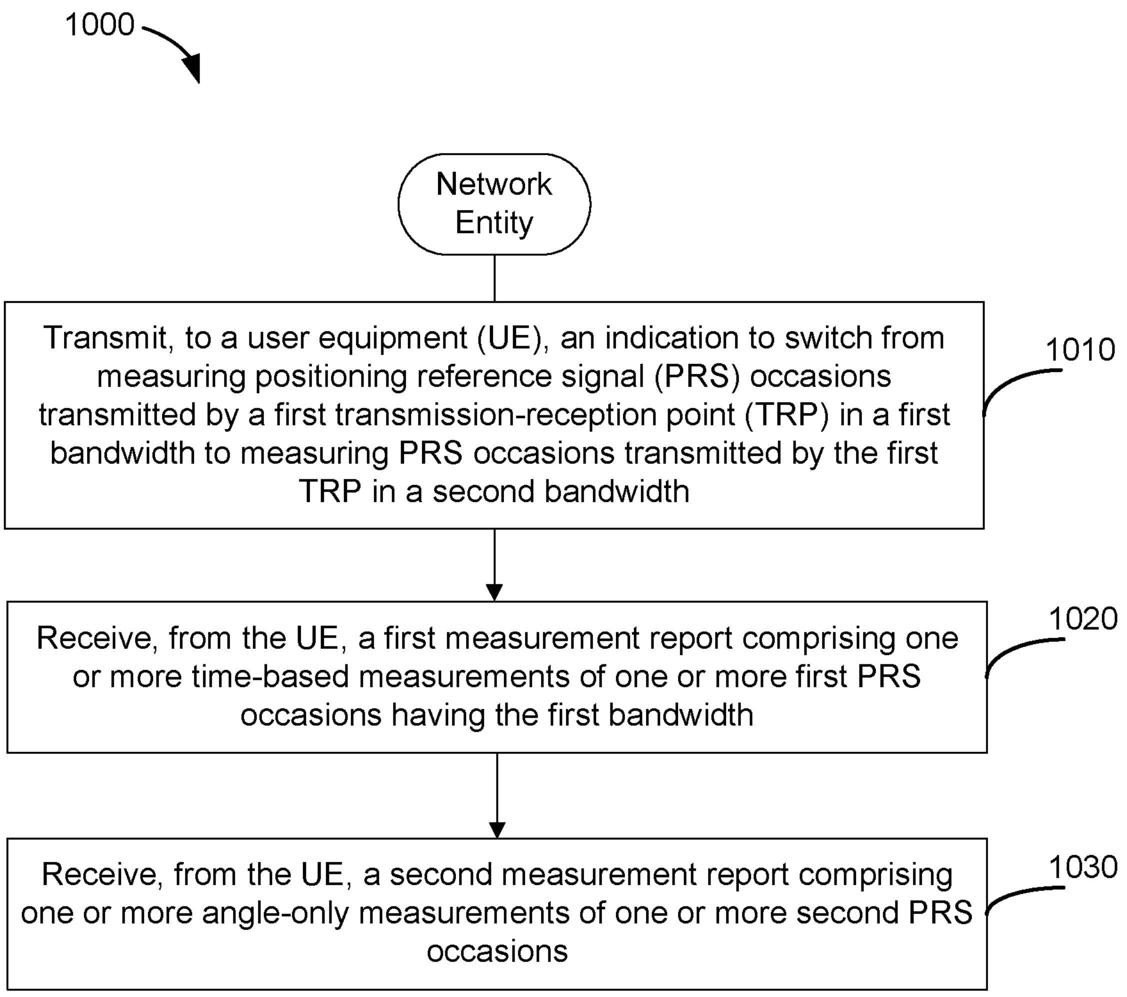

FIG. 10 illustrates an example method 1000 of wireless communication, according to aspects of the disclosure. In an aspect, the method 1000 may be performed by a network entity, such as a positioning entity, any of the base stations described herein, a location server, and LMF, etc.

At 1010, the network entity transmits, to a UE (e.g., any of the UEs described herein), an indication to switch from measuring positioning reference signal (PRS) occasions transmitted by a first TRP (e.g., a TRP of any of the base stations described herein) in a first bandwidth to measuring PRS occasions transmitted by the first TRP in a second bandwidth. In an aspect, where the network entity is a base station, operation 1010 may be performed by the one or more WWAN transceivers 350, the one or more processors 384, memory 386, and/or positioning component 388, any or all of which may be considered means for performing this operation. Where the network entity is a core network entity, operation 1010 may be performed by the one or more network transceivers 390, the one or more processors 394, memory 396, and/or positioning component 398, any or all of which may be considered means for performing this operation.

At 1020, the network entity receives, from the UE, a first measurement report comprising one or more time-based measurements of one or more first PRS occasions having the first bandwidth. In an aspect, where the network entity is a base station, operation 1020 may be performed by the one or more WWAN transceivers 350, the one or more processors 384, memory 386, and/or positioning component 388, any or all of which may be considered means for performing this operation. Where the network entity is a core network entity, operation 1020 may be performed by the one or more network transceivers 390, the one or more processors 394, memory 396, and/or positioning component 398, any or all of which may be considered means for performing this operation.

At 1030, the network entity receives, from the UE, a second measurement report comprising one or more angle-only measurements of one or more second PRS occasions. In an aspect, where the network entity is a base station, operation 1030 may be performed by the one or more WWAN transceivers 350, the one or more processors 384, memory 386, and/or positioning component 388, any or all of which may be considered means for performing this operation. Where the network entity is a core network entity, operation 1030 may be performed by the one or more network transceivers 390, the one or more processors 394, memory 396, and/or positioning component 398, any or all of which may be considered means for performing this operation.

As will be appreciated, technical advantages of the methods 900 and 1000 include improved bandwidth utilization, faster location tracking, and improved beam tracking due to the use of lower bandwidth angle-only measurements.

Using different PRS bandwidths for different types of measurements has several technical advantages. For example, rather than every PRS occasion occupying the full PRS bandwidth, only a subset of configured PRS occasions may occupy the full bandwidth and the remaining PRS occasions may occupy a smaller bandwidth. This would reduce the amount of spectrum used for PRS, opening it up for other uses. Another technical advantage is that the angle-only measurements performed on lower (smaller) bandwidth PRS occasions can be used for more rapid positioning tracking without the larger bandwidth needed for time-based measurements. That is, the UE can use a subsequent angle-only measurement of a lower bandwidth PRS occasion to refine, or update, a previous time-and-angle-based measurement of a larger bandwidth PRS occasion. Yet another technical advantage is that the angle-only measurements also serve as a beam-tracking procedure to correct, or refine, the transmit/receive beam for PRS measurement, making the PRS measurement more accurate.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: measuring one or more first positioning reference signal (PRS) occasions having a first bandwidth, the one or more first PRS occasions transmitted by a first transmission-reception point (TRP); receiving an indication to switch from measuring PRS occasions from the first TRP in the first bandwidth to measuring PRS occasions from the first TRP in a second bandwidth; and measuring one or more second PRS occasions having the second bandwidth, the one or more second PRS occasions transmitted by the first TRP.

Clause 2. The method of clause 1, wherein the first bandwidth is larger than the second bandwidth.

Clause 3. The method of clause 2, further comprising: performing one or more time-based measurements of the one or more first PRS occasions; and performing one or more angle-only measurements of the one or more second PRS occasions.

Clause 4. The method of clause 3, further comprising: performing one or more angle-only measurements of the one or more first PRS occasions.

Clause 5. The method of any of clauses 3 to 4, further comprising: reporting the one or more time-based measurements to a positioning entity; and reporting the one or more angle-only measurements to the positioning entity.

Clause 6. The method of clause 5, wherein: the UE reports the one or more time-based measurements to the positioning entity in a first Layer 1 (L1), Layer 2 (L2), or Layer 3 (L3) measurement report, and the UE reports the one or more angle-only measurements to the positioning entity in a second L1, L2, or L3 measurement report.

Clause 7. The method of any of clauses 5 to 6, wherein the positioning entity comprises a location server, a location management function (LMF), a serving base station, or a third-party application.

Clause 8. The method of any of clauses 3 to 7, wherein: the one or more time-based measurements comprise one or more reference signal time difference (RSTD) measurements, one or more time-of-arrival (ToA) measurements, one or more transmission-to-reception (Tx-Rx) measurements, one or more reception-to-transmission (Rx-Tx) measurements, or any combination thereof, and the one or more angle-only measurements comprise one or more reference signal received power (RSRP) measurements, one or more angle-of-arrival (AoA) measurements, one or more angle-of-departure (AoD) measurements, or any combination thereof Clause 9. The method of any of clauses 1 to 8, further comprising: receiving a PRS configuration, the PRS configuration specifying: PRS occasions having the first bandwidth, including the one or more first PRS occasions, the first bandwidth, PRS occasions having the second bandwidth, including the one or more second PRS occasions, and the second bandwidth.

Clause 10. The method of clause 9, wherein the PRS configuration further specifies a switching pattern indicating first time periods during which the UE is expected to measure the PRS occasions having the first bandwidth and second time periods during which the UE is expected to measure the PRS occasions having the second bandwidth.

Clause 11. The method of clause 10, wherein: the first time periods comprise PRS occasions, slots, subframes, or radio frames, and the second time periods comprise PRS occasions, slots, subframes, or radio frames.

Clause 12. The method of any of clauses 10 to 11, wherein receiving the indication comprises receiving the switching pattern.

Clause 13. The method of any of clauses 9 to 12, wherein the indication indicates that the UE is expected to measure all PRS occasions that are scheduled after reception of the indication that have the second bandwidth.

Clause 14. The method of any of clauses 9 to 13, wherein: the indication indicates a one-time switching pattern for a set of the PRS occasions having the first bandwidth and a set of the PRS occasions having the second bandwidth that are scheduled after reception of the indication, the indication indicates a switching pattern for all the PRS occasions having the first bandwidth and all the PRS occasions having the second bandwidth that are scheduled after reception of the indication, or the indication indicates a repeating switching pattern for all the PRS occasions having the first bandwidth and all the PRS occasions having the second bandwidth that are scheduled after reception of the indication.

Clause 15. The method of any of clauses 9 to 14, wherein the indication is received from a serving base station in downlink control information (DCI), a medium access control control element (MAC-CE), or radio resource control (RRC) signaling.

Clause 16. The method of any of clauses 9 to 14, wherein the indication is received from a location server in a Long-Term Evolution (LTE) positioning protocol (LPP) message.

Clause 17. The method of any of clauses 1 to 16, further comprising: receiving a first PRS configuration for PRS occasions having the first bandwidth; and receiving a second PRS configuration for PRS occasions having the second bandwidth, wherein all PRS occasions of the first PRS configuration and all PRS occasions of the second PRS configuration are for the same positioning frequency layer for the first TRP.

Clause 18. The method of clause 17, wherein PRS occasions of the second PRS configuration that overlap PRS configurations of the first PRS configuration are muted.

Clause 19. The method of any of clauses 17 to 18, wherein: the first PRS configuration is associated with a first type of measurement report, and the second PRS configuration is associated with a second type of measurement report.

Clause 20. The method of clause 19, wherein: the first type of measurement report comprises a time-and-angle-based measurement report or a time-only measurement report, and the second type of measurement report comprises an angle-only measurement report.

Clause 21. The method of any of clauses 17 to 20, wherein: the first PRS configuration specifies a first number of bandwidth parts (BWPs) for PRS occasions of the first PRS configuration, the first bandwidth comprises the first number of BWPs, the second PRS configuration specifies a second number of BWPs for PRS occasions of the second PRS configuration, and the second bandwidth comprises the second number of BWPs.

Clause 22. A method of wireless communication performed by a network entity, comprising: transmitting, to a user equipment (UE), an indication to switch from measuring positioning reference signal (PRS) occasions transmitted by a first transmission-reception point (TRP) in a first bandwidth to measuring PRS occasions transmitted by the first TRP in a second bandwidth; receiving, from the UE, a first measurement report comprising one or more measurements of one or more first PRS occasions having the first bandwidth; and receiving, from the UE, a second measurement report comprising one or more measurements of one or more second PRS occasions.

Clause 23. The method of clause 22, wherein the first bandwidth is larger than the second bandwidth.

Clause 24. The method of clause 23, wherein: the first measurement report comprises one or more time-based measurements of the one or more first PRS occasions; and the second measurement report comprises one or more angle-only measurements of the one or more second PRS occasions.

Clause 25. The method of clause 24, further comprising: estimating a location of the UE based on the one or more time-based measurements.

Clause 26. The method of clause 25, further comprising: refining the location of the UE based on the one or more angle-only measurements.

Clause 27. The method of any of clauses 25 to 26, further comprising: determining whether a line-of-sight (LOS) condition associated with at least one of the one or more time-based measurements has changed based on the one or more angle-only measurements; and pruning the at least one of the one or more time-based measurements based on determining that the LOS condition has changed more than a threshold.

Clause 28. The method of any of clauses 25 to 27, further comprising: determining a quasi-co-location (QCL) relation for a subsequent PRS occasion having the first bandwidth based on the one or more time-based measurements.

Clause 29. The method of any of clauses 24 to 28, wherein: the one or more time-based measurements comprise one or more reference signal time difference (RSTD) measurements, one or more time-of-arrival (ToA) measurements, one or more transmission-to-reception (Tx-Rx) measurements, one or more reception-to-transmission (Rx-Tx) measurements, or any combination thereof, and the one or more angle-only measurements comprise one or more reference signal received power (RSRP) measurements, one or more angle-of-arrival (AoA) measurements, one or more angle-of-departure (AoD) measurements, or any combination thereof Clause 30. The method of any of clauses 22 to 29, wherein: the first measurement report comprises a first Layer 1 (L1), Layer 2 (L2), or Layer 3 (L3) measurement report, and the second measurement report comprises a second L1, L2, or L3 measurement report.

Clause 31. The method of any of clauses 22 to 30, further comprising: transmitting, to the UE, a first PRS configuration for the first TRP, the first PRS configuration specifying first PRS occasions, including the one or more first PRS occasions, having the first bandwidth; and transmitting, to the UE, a second PRS configuration for the first TRP, the second PRS configuration specifying second PRS occasions, including the one or more second PRS occasions, having a second bandwidth.

Clause 32. The method of clause 31, wherein: the first PRS configuration further specifies the first bandwidth, and the second PRS configuration further specifies the second bandwidth.

Clause 33. The method of any of clauses 31 to 32, wherein the first and second PRS configurations further specify a switching pattern indicating first time periods during which the UE is expected to measure the first PRS occasions having the first bandwidth and second time periods during which the UE is expected to measure the second PRS occasions having the second bandwidth.

Clause 34. The method of clause 33, wherein: the first time periods comprise PRS occasions, slots, subframes, or radio frames, and the second time periods comprise PRS occasions, slots, subframes, or radio frames.

Clause 35. The method of any of clauses 33 to 34, wherein transmitting the indication comprises transmitting the switching pattern.

Clause 36. The method of any of clauses 31 to 35, wherein all PRS occasions of the first PRS configuration and all PRS occasions of the second PRS configuration are for the same positioning frequency layer for the first TRP.

Clause 37. The method of clause 36, wherein PRS occasions of the second PRS configuration that overlap PRS configurations of the first PRS configuration are muted.

Clause 38. The method of any of clauses 36 to 37, wherein: the first PRS configuration is associated with a first type of measurement report, and the second PRS configuration is associated with a second type of measurement report.

Clause 39. The method of clause 38, wherein: the first type of measurement report comprises a time-and-angle-based measurement report or a time-only measurement report, and the second type of measurement report comprises an angle-only measurement report.

Clause 40. The method of any of clauses 36 to 39, wherein: the first PRS configuration specifies a first number of bandwidth parts (BWPs) for PRS occasions of the first PRS configuration, the first bandwidth comprises the first number of BWPs, the second PRS configuration specifies a second number of BWPs for PRS occasions of the second PRS configuration, and the second bandwidth comprises the second number of BWPs.

Clause 41. The method of any of clauses 22 to 40, wherein: the network entity comprises a base station serving the UE, and the base station transmits the indication to the UE in downlink control information (DCI), a medium access control control element (MAC-CE), or radio resource control (RRC) signaling.

Clause 42. The method of any of clauses 22 to 40, wherein: the network entity comprises a location server, and the location server transmits the indication to the UE in a Long-Term Evolution (LTE) positioning protocol (LPP) message.

Clause 43. The method of any of clauses 22 to 42, wherein the indication indicates that the UE is expected to measure all PRS occasions that are scheduled after reception of the indication that have the second bandwidth.

Clause 44. The method of any of clauses 22 to 43, wherein: the indication indicates a one-time switching pattern for a set of the PRS occasions having the first bandwidth and a set of the PRS occasions having the second bandwidth that are scheduled after reception of the indication, the indication indicates a switching pattern for all the PRS occasions having the first bandwidth and all the PRS occasions having the second bandwidth that are scheduled after reception of the indication, or the indication indicates a repeating switching pattern for all the PRS occasions having the first bandwidth and all the PRS occasions having the second bandwidth that are scheduled after reception of the indication.

Clause 45. The method of any of clauses 22 to 41, 43, and 44, wherein: the network entity comprises a base station serving the UE, and the base station forwards the first measurement report and the second measurement report to a location server.

Clause 46. An apparatus comprising a memory, at least one transceiver, and at least one processor communicatively coupled to the memory and the at least one transceiver, the memory, the at least one transceiver, and the at least one processor configured to perform a method according to any of clauses 1 to 45.

Clause 47. An apparatus comprising means for performing a method according to any of clauses 1 to 45.

Clause 48. A non-transitory computer-readable medium storing computer-executable instructions, the computer-executable comprising at least one instruction for causing a computer or processor to perform a method according to any of clauses 1 to 45.

Additional implementation examples are described in the following numbered clauses:

Clause 1. A method of wireless communication performed by a user equipment (UE), comprising: performing one or more time-based measurements of one or more first positioning reference signal (PRS) occasions transmitted by a first transmission-reception point (TRP), the one or more first PRS occasions having a first bandwidth; receiving an indication to switch from measuring PRS occasions from the first TRP in the first bandwidth to measuring PRS occasions from the first TRP in a second bandwidth; and performing one or more angle-only measurements of one or more second PRS occasions transmitted by the first TRP, the one or more second PRS occasions having the second bandwidth.

Clause 2. The method of clause 1, wherein the first bandwidth is larger than the second bandwidth.

1Clause 3. The method of any of clauses 1 to 2, further comprising: performing one or more angle-only measurements of the one or more first PRS occasions in addition to the one or more time-based measurements of the one or more first PRS occasions.

Clause 4. The method of any of clauses 1 to 3, further comprising: reporting the one or more time-based measurements of the one or more first PRS occasions to a positioning entity; and reporting the one or more angle-only measurements of the one or more second PRS occasions to the positioning entity.

Clause 5. The method of any of clauses 1 to 4, wherein: the one or more time-based measurements comprise one or more reference signal time difference (RSTD) measurements, one or more time-of-arrival (ToA) measurements, one or more transmission-to-reception (Tx-Rx) time difference measurements, one or more reception-to-transmission (Rx-Tx) time difference measurements, or any combination thereof, and the one or more angle-only measurements comprise one or more reference signal received power (RSRP) measurements, one or more angle-of-arrival (AoA) measurements, one or more angle-of-departure (AoD) measurements, or any combination thereof.

Clause 6. The method of any of clauses 1 to 5, further comprising: receiving a PRS configuration, the PRS configuration specifying: PRS occasions having the first bandwidth, including the one or more first PRS occasions, the first bandwidth, PRS occasions having the second bandwidth, including the one or more second PRS occasions, and the second bandwidth.

Clause 7. The method of clause 6, wherein the PRS configuration further specifies a switching pattern indicating first time periods during which the UE is expected to measure the PRS occasions having the first bandwidth and second time periods during which the UE is expected to measure the PRS occasions having the second bandwidth.

Clause 8. The method of clause 7, wherein receiving the indication comprises receiving the switching pattern.

Clause 9. The method of any of clauses 6 to 8, wherein the indication indicates that the UE is expected to measure all PRS occasions that are scheduled after reception of the indication that have the second bandwidth.

Clause 10. The method of any of clauses 6 to 9, wherein: the indication indicates a one-time switching pattern for a set of the PRS occasions having the first bandwidth and a set of the PRS occasions having the second bandwidth that are scheduled after reception of the indication, the indication indicates a switching pattern for all the PRS occasions having the first bandwidth and all the PRS occasions having the second bandwidth that are scheduled after reception of the indication, or the indication indicates a repeating switching pattern for all the PRS occasions having the first bandwidth and all the PRS occasions having the second bandwidth that are scheduled after reception of the indication.

Clause 11. The method of any of clauses 1 to 10, further comprising: receiving a first PRS configuration for PRS occasions having the first bandwidth; and receiving a second PRS configuration for PRS occasions having the second bandwidth, wherein all PRS occasions of the first PRS configuration and all PRS occasions of the second PRS configuration are for the same positioning frequency layer for the first TRP.

Clause 12. The method of clause 11, wherein PRS occasions of the second PRS configuration that overlap PRS configurations of the first PRS configuration in time are muted.

Clause 13. The method of any of clauses 11 to 12, wherein: the first PRS configuration is associated with a first type of measurement report, the second PRS configuration is associated with a second type of measurement report, the first type of measurement report comprises a time-based or a time-and-angle-based measurement report or a time-only measurement report, and the second type of measurement report comprises an angle-only measurement report.

Clause 14. A method of wireless communication performed by a network entity, comprising: transmitting, to a user equipment (UE), an indication to switch from measuring positioning reference signal (PRS) occasions transmitted by a first transmission-reception point (TRP) in a first bandwidth to measuring PRS occasions transmitted by the first TRP in a second bandwidth; receiving, from the UE, a first measurement report comprising one or more time-based measurements of one or more first PRS occasions having the first bandwidth; and receiving, from the UE, a second measurement report comprising one or more angle-only measurements of one or more second PRS occasions.

Clause 15. The method of clause 14, wherein the first bandwidth is larger than the second bandwidth.

Clause 16. The method of any of clauses 14 to 15, further comprising: estimating a location of the UE based on the one or more time-based measurements; and refining the location of the UE based on the one or more angle-only measurements.

Clause 17. The method of any of clauses 14 to 16, further comprising: determining whether a line-of-sight (LOS) condition associated with at least one of the one or more time-based measurements has changed based on the one or more angle-only measurements; and pruning the at least one of the one or more time-based measurements based on determining that the LOS condition has changed more than a threshold.

Clause 18. The method of any of clauses 14 to 17, further comprising: determining a quasi-co-location (QCL) relation for a subsequent PRS occasion having the first bandwidth based on the one or more time-based measurements.

Clause 19. The method of any of clauses 14 to 18, further comprising: transmitting, to the UE, a first PRS configuration for the first TRP, the first PRS configuration specifying the first bandwidth and first PRS occasions, including the one or more first PRS occasions, having the first bandwidth; and transmitting, to the UE, a second PRS configuration for the first TRP, the second PRS configuration specifying the second bandwidth and second PRS occasions, including the one or more second PRS occasions, having a second bandwidth.

Clause 20. The method of clause 19, wherein the first PRS configuration and the second PRS configuration further specify a switching pattern indicating first time periods during which the UE is expected to measure the first PRS occasions having the first bandwidth and second time periods during which the UE is expected to measure the second PRS occasions having the second bandwidth.

Clause 21. The method of clause 20, wherein transmitting the indication comprises transmitting the switching pattern.

Clause 22. The method of any of clauses 19 to 21, wherein all PRS occasions of the first PRS configuration and all PRS occasions of the second PRS configuration are for the same positioning frequency layer for the first TRP.

Clause 23. The method of any of clauses 19 to 22, wherein PRS occasions of the second PRS configuration that overlap PRS configurations of the first PRS configuration in time are muted.

Clause 24. The method of any of clauses 19 to 23, wherein: the first PRS configuration is associated with a first type of measurement report, the second PRS configuration is associated with a second type of measurement report, the first type of measurement report comprises a time-and-angle-based measurement report or a time-only measurement report, and the second type of measurement report comprises an angle-only measurement report.

Clause 25. The method of any of clauses 19 to 24, wherein: the first PRS configuration specifies a first number of bandwidth parts (BWPs) for PRS occasions of the first PRS configuration, the first bandwidth comprises the first number of BWPs, the second PRS configuration specifies a second number of BWPs for PRS occasions of the second PRS configuration, and the second bandwidth comprises the second number of BWPs.

Clause 26. The method of any of clauses 14 to 25, wherein the indication indicates that the UE is expected to measure all PRS occasions that are scheduled after reception of the indication that have the second bandwidth.

Clause 27. The method of any of clauses 14 to 26, wherein: the indication indicates a one-time switching pattern for a set of the PRS occasions having the first bandwidth and a set of the PRS occasions having the second bandwidth that are scheduled after reception of the indication, the indication indicates a switching pattern for all the PRS occasions having the first bandwidth and all the PRS occasions having the second bandwidth that are scheduled after reception of the indication, or the indication indicates a repeating switching pattern for all the PRS occasions having the first bandwidth and all the PRS occasions having the second bandwidth that are scheduled after reception of the indication.

Clause 28. The method of any of clauses 14 to 27, wherein: the network entity comprises a base station serving the UE, and the base station forwards the first measurement report and the second measurement report to a location server.

Clause 29. A user equipment (UE), comprising: a memory; at least one transceiver; and at least one processor communicatively coupled to the memory and the at least one transceiver, the at least one processor configured to: perform one or more time-based measurements of one or more first positioning reference signal (PRS) occasions transmitted by a first transmission-reception point (TRP), the one or more first PRS occasions having a first bandwidth; receive, via the at least one transceiver, an indication to switch from measuring PRS occasions from the first TRP in the first bandwidth to measuring PRS occasions from the first TRP in a second bandwidth; and perform one or more angle-only measurements of one or more second PRS occasions transmitted by the first TRP, the one or more second PRS occasions having the second bandwidth.

Clause 30. The UE of clause 29, wherein the first bandwidth is larger than the second bandwidth.

Clause 31. The UE of any of clauses 29 to 30, wherein the at least one processor is further configured to: perform one or more angle-only measurements of the one or more first PRS occasions in addition to the one or more time-based measurements of the one or more first PRS occasions.

Clause 32. The UE of any of clauses 29 to 31, wherein the at least one processor is further configured to: report the one or more time-based measurements of the one or more first PRS occasions to a positioning entity; and report the one or more angle-only measurements of the one or more second PRS occasions to the positioning entity.

Clause 33. The UE of any of clauses 29 to 32, wherein: the one or more time-based measurements comprise one or more reference signal time difference (RSTD) measurements, one or more time-of-arrival (ToA) measurements, one or more transmission-to-reception (Tx-Rx) time difference measurements, one or more reception-to-transmission (Rx-Tx) time difference measurements, or any combination thereof, and the one or more angle-only measurements comprise one or more reference signal received power (RSRP) measurements, one or more angle-of-arrival (AoA) measurements, one or more angle-of-departure (AoD) measurements, or any combination thereof.

Clause 34. The UE of any of clauses 29 to 33, wherein the at least one processor is further configured to: receive, via the at least one transceiver, a PRS configuration, the PRS configuration specifying: PRS occasions having the first bandwidth, including the one or more first PRS occasions, the first bandwidth, PRS occasions having the second bandwidth, including the one or more second PRS occasions, and the second bandwidth.

Clause 35. The UE of clause 34, wherein the PRS configuration further specifies a switching pattern indicating first time periods during which the UE is expected to measure the PRS occasions having the first bandwidth and second time periods during which the UE is expected to measure the PRS occasions having the second bandwidth.

Clause 36. The UE of clause 35, wherein the at least one processor configured to receive the indication comprises the at least one processor configured to receive the switching pattern.

Clause 37. The UE of any of clauses 34 to 36, wherein the indication indicates that the UE is expected to measure all PRS occasions that are scheduled after reception of the indication that have the second bandwidth.

Clause 38. The UE of any of clauses 34 to 37, wherein: the indication indicates a one-time switching pattern for a set of the PRS occasions having the first bandwidth and a set of the PRS occasions having the second bandwidth that are scheduled after reception of the indication, the indication indicates a switching pattern for all the PRS occasions having the first bandwidth and all the PRS occasions having the second bandwidth that are scheduled after reception of the indication, or the indication indicates a repeating switching pattern for all the PRS occasions having the first bandwidth and all the PRS occasions having the second bandwidth that are scheduled after reception of the indication.

Clause 39. The UE of any of clauses 29 to 38, wherein the at least one processor is further configured to: receive, via the at least one transceiver, a first PRS configuration for PRS occasions having the first bandwidth; and receive, via the at least one transceiver, a second PRS configuration for PRS occasions having the second bandwidth, wherein all PRS occasions of the first PRS configuration and all PRS occasions of the second PRS configuration are for the same positioning frequency layer for the first TRP.

Clause 40. The UE of clause 39, wherein PRS occasions of the second PRS configuration that overlap PRS configurations of the first PRS configuration in time are muted.

Clause 41. The UE of any of clauses 39 to 40, wherein: the first PRS configuration is associated with a first type of measurement report, the second PRS configuration is associated with a second type of measurement report, the first type of measurement report comprises a time-based or a time-and-angle-based measurement report or a time-only measurement report, and the second type of measurement report comprises an angle-only measurement report.

Clause 42. A network entity, comprising: a memory; at least one transceiver; and at least one processor communicatively coupled to the memory and the at least one transceiver, the at least one processor configured to: transmit, via the at least one transceiver, to a user equipment (UE), an indication to switch from measuring positioning reference signal (PRS) occasions transmitted by a first transmission-reception point (TRP) in a first bandwidth to measuring PRS occasions transmitted by the first TRP in a second bandwidth; receive, via the at least one transceiver, from the UE, a first measurement report comprising one or more time-based measurements of one or more first PRS occasions having the first bandwidth; and receive, via the at least one transceiver, from the UE, a second measurement report comprising one or more angle-only measurements of one or more second PRS occasions.

Clause 43. The network entity of clause 42, wherein the first bandwidth is larger than the second bandwidth.

Clause 44. The network entity of any of clauses 42 to 43, wherein the at least one processor is further configured to: estimate a location of the UE based on the one or more time-based measurements; and the location of the UE based on the one or more angle-only measurements.

Clause 45. The network entity of any of clauses 42 to 44, wherein the at least one processor is further configured to: determine whether a line-of-sight (LOS) condition associated with at least one of the one or more time-based measurements has changed based on the one or more angle-only measurements; and prune the at least one of the one or more time-based measurements based on determining that the LOS condition has changed more than a threshold.

Clause 46. The network entity of any of clauses 42 to 45, wherein the at least one processor is further configured to: determine a quasi-co-location (QCL) relation for a subsequent PRS occasion having the first bandwidth based on the one or more time-based measurements.

Clause 47. The network entity of any of clauses 42 to 46, wherein the at least one processor is further configured to: transmit, via the at least one transceiver, to the UE, a first PRS configuration for the first TRP, the first PRS configuration specifying the first bandwidth and first PRS occasions, including the one or more first PRS occasions, having the first bandwidth; and transmit, via the at least one transceiver, to the UE, a second PRS configuration for the first TRP, the second PRS configuration specifying the second bandwidth and second PRS occasions, including the one or more second PRS occasions, having a second bandwidth.

Clause 48. The network entity of clause 47, wherein the first PRS configuration and the second PRS configuration further specify a switching pattern indicating first time periods during which the UE is expected to measure the first PRS occasions having the first bandwidth and second time periods during which the UE is expected to measure the second PRS occasions having the second bandwidth.

Clause 49. The network entity of clause 48, wherein the at least one processor configured to transmit the indication comprises the at least one processor configured to transmit the switching pattern.

Clause 50. The network entity of any of clauses 47 to 49, wherein all PRS occasions of the first PRS configuration and all PRS occasions of the second PRS configuration are for the same positioning frequency layer for the first TRP.

Clause 51. The network entity of any of clauses 47 to 50, wherein PRS occasions of the second PRS configuration that overlap PRS configurations of the first PRS configuration in time are muted.

Clause 52. The network entity of any of clauses 47 to 51, wherein: the first PRS configuration is associated with a first type of measurement report, the second PRS configuration is associated with a second type of measurement report, the first type of measurement report comprises a time-and-angle-based measurement report or a time-only measurement report, and the second type of measurement report comprises an angle-only measurement report.

Clause 53. The network entity of any of clauses 47 to 52, wherein: the first PRS configuration specifies a first number of bandwidth parts (BWPs) for PRS occasions of the first PRS configuration, the first bandwidth comprises the first number of BWPs, the second PRS configuration specifies a second number of BWPs for PRS occasions of the second PRS configuration, and the second bandwidth comprises the second number of BWPs.

Clause 54. The network entity of any of clauses 42 to 53, wherein the indication indicates that the UE is expected to measure all PRS occasions that are scheduled after reception of the indication that have the second bandwidth.

Clause 55. The network entity of any of clauses 42 to 54, wherein: the indication indicates a one-time switching pattern for a set of the PRS occasions having the first bandwidth and a set of the PRS occasions having the second bandwidth that are scheduled after reception of the indication, the indication indicates a switching pattern for all the PRS occasions having the first bandwidth and all the PRS occasions having the second bandwidth that are scheduled after reception of the indication, or the indication indicates a repeating switching pattern for all the PRS occasions having the first bandwidth and all the PRS occasions having the second bandwidth that are scheduled after reception of the indication.

Clause 56. The network entity of any of clauses 42 to 55, wherein: the network entity comprises a base station serving the UE, and the base station forwards the first measurement report and the second measurement report to a location server.

Clause 57. A user equipment (UE), comprising: means for performing one or more time-based measurements of one or more first positioning reference signal (PRS) occasions transmitted by a first transmission-reception point (TRP), the one or more first PRS occasions having a first bandwidth; means for receiving an indication to switch from measuring PRS occasions from the first TRP in the first bandwidth to measuring PRS occasions from the first TRP in a second bandwidth; and means for performing one or more angle-only measurements of one or more second PRS occasions transmitted by the first TRP, the one or more second PRS occasions having the second bandwidth.

Clause 58. The UE of clause 57, wherein the first bandwidth is larger than the second bandwidth.

Clause 59. The UE of any of clauses 57 to 58, further comprising: means for performing one or more angle-only measurements of the one or more first PRS occasions in addition to the one or more time-based measurements of the one or more first PRS occasions.

Clause 60. The UE of any of clauses 57 to 59, further comprising: means for reporting the one or more time-based measurements of the one or more first PRS occasions to a positioning entity; and means for reporting the one or more angle-only measurements of the one or more second PRS occasions to the positioning entity.

Clause 61. The UE of any of clauses 57 to 60, wherein: the one or more time-based measurements comprise one or more reference signal time difference (RSTD) measurements, one or more time-of-arrival (ToA) measurements, one or more transmission-to-reception (Tx-Rx) time difference measurements, one or more reception-to-transmission (Rx-Tx) time difference measurements, or any combination thereof, and the one or more angle-only measurements comprise one or more reference signal received power (RSRP) measurements, one or more angle-of-arrival (AoA) measurements, one or more angle-of-departure (AoD) measurements, or any combination thereof.

Clause 62. The UE of any of clauses 57 to 61, further comprising: means for receiving a PRS configuration, the PRS configuration specifying: PRS occasions having the first bandwidth, including the one or more first PRS occasions, the first bandwidth, PRS occasions having the second bandwidth, including the one or more second PRS occasions, and the second bandwidth.

Clause 63. The UE of clause 62, wherein the PRS configuration further specifies a switching pattern indicating first time periods during which the UE is expected to measure the PRS occasions having the first bandwidth and second time periods during which the UE is expected to measure the PRS occasions having the second bandwidth.

Clause 64. The UE of clause 63, wherein the means for receiving the indication comprises means for receiving the switching pattern.

Clause 65. The UE of any of clauses 62 to 64, wherein the indication indicates that the UE is expected to measure all PRS occasions that are scheduled after reception of the indication that have the second bandwidth.

Clause 66. The UE of any of clauses 62 to 65, wherein: the indication indicates a one-time switching pattern for a set of the PRS occasions having the first bandwidth and a set of the PRS occasions having the second bandwidth that are scheduled after reception of the indication, the indication indicates a switching pattern for all the PRS occasions having the first bandwidth and all the PRS occasions having the second bandwidth that are scheduled after reception of the indication, or the indication indicates a repeating switching pattern for all the PRS occasions having the first bandwidth and all the PRS occasions having the second bandwidth that are scheduled after reception of the indication.

Clause 67. The UE of any of clauses 57 to 66, further comprising: means for receiving a first PRS configuration for PRS occasions having the first bandwidth; and means for receiving a second PRS configuration for PRS occasions having the second bandwidth, wherein all PRS occasions of the first PRS configuration and all PRS occasions of the second PRS configuration are for the same positioning frequency layer for the first TRP.

Clause 68. The UE of clause 67, wherein PRS occasions of the second PRS configuration that overlap PRS configurations of the first PRS configuration in time are muted.

Clause 69. The UE of any of clauses 67 to 68, wherein: the first PRS configuration is associated with a first type of measurement report, the second PRS configuration is associated with a second type of measurement report, the first type of measurement report comprises a time-based or a time-and-angle-based measurement report or a time-only measurement report, and the second type of measurement report comprises an angle-only measurement report.

Clause 70. A network entity, comprising: means for transmitting, to a user equipment (UE), an indication to switch from measuring positioning reference signal (PRS) occasions transmitted by a first transmission-reception point (TRP) in a first bandwidth to measuring PRS occasions transmitted by the first TRP in a second bandwidth; means for receiving, from the UE, a first measurement report comprising one or more time-based measurements of one or more first PRS occasions having the first bandwidth; and means for receiving, from the UE, a second measurement report comprising one or more angle-only measurements of one or more second PRS occasions.

Clause 71. The network entity of clause 70, wherein the first bandwidth is larger than the second bandwidth.

Clause 72. The network entity of any of clauses 70 to 71, further comprising: means for estimating a location of the UE based on the one or more time-based measurements; and means for the location of the UE based on the one or more angle-only measurements.

Clause 73. The network entity of any of clauses 70 to 72, further comprising: means for determining whether a line-of-sight (LOS) condition associated with at least one of the one or more time-based measurements has changed based on the one or more angle-only measurements; and means for pruning the at least one of the one or more time-based measurements based on determining that the LOS condition has changed more than a threshold.

Clause 74. The network entity of any of clauses 70 to 73, further comprising: means for determining a quasi-co-location (QCL) relation for a subsequent PRS occasion having the first bandwidth based on the one or more time-based measurements.

Clause 75. The network entity of any of clauses 70 to 74, further comprising: means for transmitting, to the UE, a first PRS configuration for the first TRP, the first PRS configuration specifying the first bandwidth and first PRS occasions, including the one or more first PRS occasions, having the first bandwidth; and means for transmitting, to the UE, a second PRS configuration for the first TRP, the second PRS configuration specifying the second bandwidth and second PRS occasions, including the one or more second PRS occasions, having a second bandwidth.

Clause 76. The network entity of clause 75, wherein the first PRS configuration and the second PRS configuration further specify a switching pattern indicating first time periods during which the UE is expected to measure the first PRS occasions having the first bandwidth and second time periods during which the UE is expected to measure the second PRS occasions having the second bandwidth.

Clause 77. The network entity of clause 76, wherein the means for transmitting the indication comprises means for transmitting the switching pattern.

Clause 78. The network entity of any of clauses 75 to 77, wherein all PRS occasions of the first PRS configuration and all PRS occasions of the second PRS configuration are for the same positioning frequency layer for the first TRP.

Clause 79. The network entity of any of clauses 75 to 78, wherein PRS occasions of the second PRS configuration that overlap PRS configurations of the first PRS configuration in time are muted.

Clause 80. The network entity of any of clauses 75 to 79, wherein: the first PRS configuration is associated with a first type of measurement report, the second PRS configuration is associated with a second type of measurement report, the first type of measurement report comprises a time-and-angle-based measurement report or a time-only measurement report, and the second type of measurement report comprises an angle-only measurement report.

Clause 81. The network entity of any of clauses 75 to 80, wherein: the first PRS configuration specifies a first number of bandwidth parts (BWPs) for PRS occasions of the first PRS configuration, the first bandwidth comprises the first number of BWPs, the second PRS configuration specifies a second number of BWPs for PRS occasions of the second PRS configuration, and the second bandwidth comprises the second number of BWPs.

Clause 82. The network entity of any of clauses 70 to 81, wherein the indication indicates that the UE is expected to measure all PRS occasions that are scheduled after reception of the indication that have the second bandwidth.

Clause 83. The network entity of any of clauses 70 to 82, wherein: the indication indicates a one-time switching pattern for a set of the PRS occasions having the first bandwidth and a set of the PRS occasions having the second bandwidth that are scheduled after reception of the indication, the indication indicates a switching pattern for all the PRS occasions having the first bandwidth and all the PRS occasions having the second bandwidth that are scheduled after reception of the indication, or the indication indicates a repeating switching pattern for all the PRS occasions having the first bandwidth and all the PRS occasions having the second bandwidth that are scheduled after reception of the indication.

Clause 84. The network entity of any of clauses 70 to 83, wherein: the network entity comprises a base station serving the UE, and the base station forwards the first measurement report and the second measurement report to a location server.

Clause 85. A non-transitory computer-readable medium storing computer-executable instructions that, when executed by a user equipment (UE), cause the UE to: perform one or more time-based measurements of one or more first positioning reference signal (PRS) occasions transmitted by a first transmission-reception point (TRP), the one or more first PRS occasions having a first bandwidth; receive an indication to switch from measuring PRS occasions from the first TRP in the first bandwidth to measuring PRS occasions from the first TRP in a second bandwidth; and perform one or more angle-only measurements of one or more second PRS occasions transmitted by the first TRP, the one or more second PRS occasions having the second bandwidth.

Clause 86. The non-transitory computer-readable medium of clause 85, wherein the first bandwidth is larger than the second bandwidth.

Clause 87. The non-transitory computer-readable medium of any of clauses 85 to 86, further comprising computer-executable instructions that, when executed by the UE, cause the UE to: perform one or more angle-only measurements of the one or more first PRS occasions in addition to the one or more time-based measurements of the one or more first PRS occasions.

Clause 88. The non-transitory computer-readable medium of any of clauses 85 to 87, further comprising computer-executable instructions that, when executed by the UE, cause the UE to: report the one or more time-based measurements of the one or more first PRS occasions to a positioning entity; and report the one or more angle-only measurements of the one or more second PRS occasions to the positioning entity.

Clause 89. The non-transitory computer-readable medium of any of clauses 85 to 88, wherein: the one or more time-based measurements comprise one or more reference signal time difference (RSTD) measurements, one or more time-of-arrival (ToA) measurements, one or more transmission-to-reception (Tx-Rx) time difference measurements, one or more reception-to-transmission (Rx-Tx) time difference measurements, or any combination thereof, and the one or more angle-only measurements comprise one or more reference signal received power (RSRP) measurements, one or more angle-of-arrival (AoA) measurements, one or more angle-of-departure (AoD) measurements, or any combination thereof.

Clause 90. The non-transitory computer-readable medium of any of clauses 85 to 89, further comprising computer-executable instructions that, when executed by the UE, cause the UE to: receive a PRS configuration, the PRS configuration specifying: PRS occasions having the first bandwidth, including the one or more first PRS occasions, the first bandwidth, PRS occasions having the second bandwidth, including the one or more second PRS occasions, and the second bandwidth.

Clause 91. The non-transitory computer-readable medium of clause 90, wherein the PRS configuration further specifies a switching pattern indicating first time periods during which the UE is expected to measure the PRS occasions having the first bandwidth and second time periods during which the UE is expected to measure the PRS occasions having the second bandwidth.

Clause 92. The non-transitory computer-readable medium of clause 91, wherein the computer-executable instructions that, when executed by the UE, cause the UE to receive the indication comprise computer-executable instructions that, when executed by the UE, cause the UE to receive the switching pattern.

Clause 93. The non-transitory computer-readable medium of any of clauses 90 to 92, wherein the indication indicates that the UE is expected to measure all PRS occasions that are scheduled after reception of the indication that have the second bandwidth.

Clause 94. The non-transitory computer-readable medium of any of clauses 90 to 93, wherein: the indication indicates a one-time switching pattern for a set of the PRS occasions having the first bandwidth and a set of the PRS occasions having the second bandwidth that are scheduled after reception of the indication, the indication indicates a switching pattern for all the PRS occasions having the first bandwidth and all the PRS occasions having the second bandwidth that are scheduled after reception of the indication, or the indication indicates a repeating switching pattern for all the PRS occasions having the first bandwidth and all the PRS occasions having the second bandwidth that are scheduled after reception of the indication.

Clause 95. The non-transitory computer-readable medium of any of clauses 85 to 94, further comprising computer-executable instructions that, when executed by the UE, cause the UE to: receive a first PRS configuration for PRS occasions having the first bandwidth; and receive a second PRS configuration for PRS occasions having the second bandwidth, wherein all PRS occasions of the first PRS configuration and all PRS occasions of the second PRS configuration are for the same positioning frequency layer for the first TRP.

Clause 96. The non-transitory computer-readable medium of clause 95, wherein PRS occasions of the second PRS configuration that overlap PRS configurations of the first PRS configuration in time are muted.

Clause 97. The non-transitory computer-readable medium of any of clauses 95 to 96, wherein: the first PRS configuration is associated with a first type of measurement report, the second PRS configuration is associated with a second type of measurement report, the first type of measurement report comprises a time-based or a time-and-angle-based measurement report or a time-only measurement report, and the second type of measurement report comprises an angle-only measurement report.

Clause 98. A non-transitory computer-readable medium storing computer-executable instructions that, when executed by a network entity, cause the network entity to: transmit, to a user equipment (UE), an indication to switch from measuring positioning reference signal (PRS) occasions transmitted by a first transmission-reception point (TRP) in a first bandwidth to measuring PRS occasions transmitted by the first TRP in a second bandwidth; receive, from the UE, a first measurement report comprising one or more time-based measurements of one or more first PRS occasions having the first bandwidth; and receive, from the UE, a second measurement report comprising one or more angle-only measurements of one or more second PRS occasions.

Clause 99. The non-transitory computer-readable medium of clause 98, wherein the first bandwidth is larger than the second bandwidth.

Clause 100. The non-transitory computer-readable medium of any of clauses 98 to 99, further comprising computer-executable instructions that, when executed by the network entity, cause the network entity to: estimate a location of the UE based on the one or more time-based measurements; and the location of the UE based on the one or more angle-only measurements.

Clause 101. The non-transitory computer-readable medium of any of clauses 98 to 100, further comprising computer-executable instructions that, when executed by the network entity, cause the network entity to: determine whether a line-of-sight (LOS) condition associated with at least one of the one or more time-based measurements has changed based on the one or more angle-only measurements; and prune the at least one of the one or more time-based measurements based on determining that the LOS condition has changed more than a threshold.

Clause 102. The non-transitory computer-readable medium of any of clauses 98 to 101, further comprising computer-executable instructions that, when executed by the network entity, cause the network entity to: determine a quasi-co-location (QCL) relation for a subsequent PRS occasion having the first bandwidth based on the one or more time-based measurements.

Clause 103. The non-transitory computer-readable medium of any of clauses 98 to 102, further comprising computer-executable instructions that, when executed by the network entity, cause the network entity to: transmit, to the UE, a first PRS configuration for the first TRP, the first PRS configuration specifying the first bandwidth and first PRS occasions, including the one or more first PRS occasions, having the first bandwidth; and transmit, to the UE, a second PRS configuration for the first TRP, the second PRS configuration specifying the second bandwidth and second PRS occasions, including the one or more second PRS occasions, having a second bandwidth.

Clause 104. The non-transitory computer-readable medium of clause 103, wherein the first PRS configuration and the second PRS configuration further specify a switching pattern indicating first time periods during which the UE is expected to measure the first PRS occasions having the first bandwidth and second time periods during which the UE is expected to measure the second PRS occasions having the second bandwidth.

Clause 105. The non-transitory computer-readable medium of clause 104, wherein the computer-executable instructions that, when executed by the network entity, cause the network entity to transmit the indication comprise computer-executable instructions that, when executed by the network entity, cause the network entity to transmit the switching pattern.

Clause 106. The non-transitory computer-readable medium of any of clauses 103 to 105, wherein all PRS occasions of the first PRS configuration and all PRS occasions of the second PRS configuration are for the same positioning frequency layer for the first TRP.

Clause 107. The non-transitory computer-readable medium of any of clauses 103 to 106, wherein PRS occasions of the second PRS configuration that overlap PRS configurations of the first PRS configuration in time are muted.

Clause 108. The non-transitory computer-readable medium of any of clauses 103 to 107, wherein: the first PRS configuration is associated with a first type of measurement report, the second PRS configuration is associated with a second type of measurement report, the first type of measurement report comprises a time-and-angle-based measurement report or a time-only measurement report, and the second type of measurement report comprises an angle-only measurement report.

Clause 109. The non-transitory computer-readable medium of any of clauses 103 to 108, wherein: the first PRS configuration specifies a first number of bandwidth parts (BWPs) for PRS occasions of the first PRS configuration, the first bandwidth comprises the first number of BWPs, the second PRS configuration specifies a second number of BWPs for PRS occasions of the second PRS configuration, and the second bandwidth comprises the second number of BWPs.

Clause 110. The non-transitory computer-readable medium of any of clauses 98 to 109, wherein the indication indicates that the UE is expected to measure all PRS occasions that are scheduled after reception of the indication that have the second bandwidth.

Clause 111. The non-transitory computer-readable medium of any of clauses 98 to 110, wherein: the indication indicates a one-time switching pattern for a set of the PRS occasions having the first bandwidth and a set of the PRS occasions having the second bandwidth that are scheduled after reception of the indication, the indication indicates a switching pattern for all the PRS occasions having the first bandwidth and all the PRS occasions having the second bandwidth that are scheduled after reception of the indication, or the indication indicates a repeating switching pattern for all the PRS occasions having the first bandwidth and all the PRS occasions having the second bandwidth that are scheduled after reception of the indication.

Clause 112. The non-transitory computer-readable medium of any of clauses 98 to 111, wherein: the network entity comprises a base station serving the UE, and the base station forwards the first measurement report and the second measurement report to a location server.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:

receiving a positioning reference signal (PRS) configuration specifying (1) PRS occasions having a first bandwidth, (2) the first bandwidth, (3) PRS occasions having a second bandwidth, and (4) the second bandwidth, wherein the PRS configuration further specifies (1) a switching pattern indicating first time periods during which the UE is expected to measure the PRS occasions having the first bandwidth and (2) second time periods during which the UE is expected to measure the PRS occasions having the second bandwidth;

performing, according to the switching pattern, one or more time-based measurements of one or more first PRS occasions transmitted by a first transmission-reception point (TRP), the one or more first PRS occasions having the first bandwidth; and performing, according to the switching pattern, only one or more angle-based measurements of one or more second PRS occasions transmitted by the first TRP, the one or more second PRS occasions having the second bandwidth.

2. The method of claim 1, wherein the first bandwidth is larger than the second bandwidth.

3. The method of claim 1, further comprising:

performing one or more angle-based measurements of the one or more first PRS occasions in addition to the one or more time-based measurements of the one or more first PRS occasions.

4. The method of claim 1, further comprising:

reporting the one or more time-based measurements of the one or more first PRS occasions to a positioning entity; and reporting the one or more angle-based measurements of the one or more second PRS occasions to the positioning entity.

5. The method of claim 1, wherein:

the one or more time-based measurements comprise one or more reference signal time difference (RSTD) measurements, one or more time-of-arrival (ToA) measurements, one or more transmission-to-reception (Tx-Rx) time difference measurements, one or more reception-to-transmission (Rx-Tx) time difference measurements, or any combination thereof, and the one or more angle-based measurements comprise one or more reference signal received power (RSRP) measurements, one or more angle-of-arrival (AoA) measurements, one or more angle-of-departure (AoD) measurements, or any combination thereof.

6. The method of claim 1, wherein:

the switching pattern is a one-time switching pattern for a set of the PRS occasions having the first bandwidth and a set of the PRS occasions having the second bandwidth that are scheduled after reception of the switching pattern, the switching pattern is a switching pattern for all the PRS occasions having the first bandwidth and all the PRS occasions having the second bandwidth that are scheduled after reception of the switching pattern, or the switching pattern is a repeating switching pattern for all the PRS occasions having the first bandwidth and all the PRS occasions having the second bandwidth that are scheduled after reception of the switching pattern.

7. The method of claim 1, wherein receiving the PRS configuration comprises:

receiving a first PRS configuration for PRS occasions having the first bandwidth; and receiving a second PRS configuration for PRS occasions having the second bandwidth, wherein all PRS occasions of the first PRS configuration and all PRS occasions of the second PRS configuration are for the same positioning frequency layer for the first TRP.

8. The method of claim 7, wherein PRS occasions of the second PRS configuration that overlap PRS configurations of the first PRS configuration in time are muted.

9. The method of claim 7, wherein:

the first PRS configuration is associated with a first type of measurement report, the second PRS configuration is associated with a second type of measurement report, the first type of measurement report comprises a time-based or a time-and-angle-based measurement report or a time-only measurement report, and the second type of measurement report comprises an angle-based measurement report.

10. A method of wireless communication performed by a network entity, comprising:

transmitting, to a user equipment (UE), a positioning reference signal (PRS) configuration specifying (1) PRS occasions having a first bandwidth, (2) the first bandwidth, (3) PRS occasions having a second bandwidth, and (4) the second bandwidth, wherein the PRS configuration further specifies (1) a switching pattern indicating first time periods during which the UE is expected to measure the PRS occasions having the first bandwidth and (2) second time periods during which the UE is expected to measure the PRS occasions having the second bandwidth;

receiving, from the UE, a first measurement report comprising one or more time-based measurements of one or more first PRS occasions having the first bandwidth, the one or more first PRS occasions transmitted by a first transmission-reception point (TRP) in the first bandwidth, the one or more time-based measurements obtained according to the switching pattern; and receiving, from the UE, a second measurement report comprising only one or more angle-based measurements of one or more second PRS occasions, the one or more second PRS occasions transmitted by the first TRP in the second bandwidth, the one or more angle-based measurements obtained according to the switching pattern.

11. The method of claim 10, wherein the first bandwidth is larger than the second bandwidth.

12. The method of claim 10, further comprising:

estimating a location of the UE based on the one or more time-based measurements; and refining the location of the UE based on the one or more angle-based measurements.

13. The method of claim 10, further comprising:

determining whether a line-of-sight (LOS) condition associated with at least one of the one or more time-based measurements has changed based on the one or more angle-based measurements; and pruning the at least one of the one or more time-based measurements based on determining that the LOS condition has changed more than a threshold.

14. The method of claim 10, further comprising:

determining a quasi-co-location (QCL) relation for a subsequent PRS occasion having the first bandwidth based on the one or more time-based measurements.

15. The method of claim 10, wherein transmitting the PRS configuration comprises:

transmitting, to the UE, a first PRS configuration for the first TRP, the first PRS configuration specifying the first bandwidth and first PRS occasions, including the one or more first PRS occasions, having the first bandwidth; and transmitting, to the UE, a second PRS configuration for the first TRP, the second PRS configuration specifying the second bandwidth and second PRS occasions, including the one or more second PRS occasions, having a second bandwidth.

16. The method of claim 15, wherein all PRS occasions of the first PRS configuration and all PRS occasions of the second PRS configuration are for the same positioning frequency layer for the first TRP.

17. The method of claim 15, wherein PRS occasions of the second PRS configuration that overlap PRS configurations of the first PRS configuration in time are muted.

18. The method of claim 15, wherein:

the first PRS configuration is associated with a first type of measurement report, the second PRS configuration is associated with a second type of measurement report, the first type of measurement report comprises a time-and-angle-based measurement report or a time-only measurement report, and the second type of measurement report comprises an angle-based measurement report.

19. The method of claim 15, wherein:

the first PRS configuration specifies a first number of bandwidth parts (BWPs) for PRS occasions of the first PRS configuration, the first bandwidth comprises the first number of BWPs, the second PRS configuration specifies a second number of BWPs for PRS occasions of the second PRS configuration, and the second bandwidth comprises the second number of BWPs.

20. The method of claim 10, wherein:

the switching pattern is a one-time switching pattern for a set of the PRS occasions having the first bandwidth and a set of the PRS occasions having the second bandwidth that are scheduled after reception of the switching pattern, the switching pattern is a switching pattern for all the PRS occasions having the first bandwidth and all the PRS occasions having the second bandwidth that are scheduled after reception of the switching pattern, or the switching pattern is a repeating switching pattern for all the PRS occasions having the first bandwidth and all the PRS occasions having the second bandwidth that are scheduled after reception of the switching pattern.

21. The method of claim 10, wherein:

the network entity comprises a base station serving the UE, and the base station forwards the first measurement report and the second measurement report to a location server.

22. A user equipment (UE), comprising:

one or more memories;

one or more transceivers; and one or more processors communicatively coupled to the one or more memories and the one or more transceivers, the one or more processors, either alone or in combination, configured to:

receive, via the one or more transceivers, a positioning reference signal (PRS) configuration specifying (1) PRS occasions having a first bandwidth, (2) the first bandwidth, (3) PRS occasions having a second bandwidth, and (4) the second bandwidth, wherein the PRS configuration further specifies (1) a switching pattern indicating first time periods during which the UE is expected to measure the PRS occasions having the first bandwidth and (2) second time periods during which the UE is expected to measure the PRS occasions having the second bandwidth;

perform, according to the switching pattern, one or more time-based measurements of one or more first PRS occasions transmitted by a first transmission- reception point (TRP), the one or more first PRS occasions having the first bandwidth; and perform, according to the switching pattern, only one or more angle-based measurements of one or more second PRS occasions transmitted by the first TRP, the one or more second PRS occasions having the second bandwidth.

23. A network entity, comprising:

one or more memories;

one or more transceivers; and one or more processors communicatively coupled to the one or more memories and the one or more transceivers, the one or more processors, either alone or in combination, configured to:

transmit, via the one or more transceivers, to a user equipment (UE), a positioning reference signal (PRS) configuration specifying (1) PRS occasions having a first bandwidth, (2) the first bandwidth, (3) PRS occasions having a second bandwidth, and (4) the second bandwidth, wherein the PRS configuration further specifies (1) a switching pattern indicating first time periods during which the UE is expected to measure the PRS occasions having the first bandwidth and (2) second time periods during which the UE is expected to measure the PRS occasions having the second bandwidth;

receive, via the one or more transceivers, from the UE, a first measurement report comprising one or more time-based measurements of one or more first PRS occasions having the first bandwidth, the one or more first PRS occasions transmitted by a first transmission-reception point (TRP) in the first bandwidth, the one or more time-based measurements obtained according to the switching pattern; and receive, via the one or more transceivers, from the UE, a second measurement report comprising only one or more angle-based measurements of one or more second PRS occasions, the one or more second PRS occasions transmitted by the first TRP in the second bandwidth, the one or more angle-based measurements obtained according to the switching pattern.

* * * * *